(12) United States Patent
Sugiyama et al.

(10) Patent No.: US 8,040,480 B2
(45) Date of Patent: Oct. 18, 2011

(54) LIQUID CRYSTAL DISPLAY APPARATUS

(75) Inventors: Takashi Sugiyama, Yokohama (JP); Masatoshi Horii, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 209 days.

(21) Appl. No.: 12/398,032

(22) Filed: Mar. 4, 2009

(65) Prior Publication Data

US 2009/0225257 A1    Sep. 10, 2009

(30) Foreign Application Priority Data

Mar. 4, 2008  (JP) ................................ 2008-052912
Mar. 24, 2008 (JP) ................................ 2008-076185

(51) Int. Cl.
*G02F 1/1343* (2006.01)
(52) U.S. Cl. ........................................ 349/141; 349/142
(58) Field of Classification Search .................. None
See application file for complete search history.

(56) References Cited

U.S. PATENT DOCUMENTS

| 7,463,321 B2 * | 12/2008 | Song et al. ............ 349/129 |
| 2008/0035474 A1 * | 2/2008 | Wang et al. .......... 204/242 |
| 2008/0278643 A1 | 11/2008 | Iwamoto | |

FOREIGN PATENT DOCUMENTS

| JP | 2000-250024 A | 9/2000 |
| JP | 2005-234254 A | 9/2005 |
| JP | 2008-281752 A | 11/2008 |

OTHER PUBLICATIONS

"Electric Drive of LCDs" by Takashi Sugiyama and Shunsuke Kobayashi, "Display and Imaging" magazine, 1994, vol. 3, pp. 117-131, published by Science Communications International.

* cited by examiner

*Primary Examiner* — Tina Wong
(74) *Attorney, Agent, or Firm* — Holtz, Holtz, Goodman & Chick, P.C.

(57) ABSTRACT

A liquid crystal display apparatus includes a vertical alignment type liquid crystal cell including a first substrate formed with a first electrode, a second substrate formed with a second electrode, and a liquid crystal layer containing liquid crystal molecules given a pretilt angle. A pair of polarizer plates sandwiches the cell, and a driver device applies a voltage of a multiplex driving waveform across the first and second electrodes. In a display in-plane parallel to a surface of the first or second substrate, at least one of the first and second electrodes has a zigzag border alternately coupling a first border perpendicular to display in-plane components of directors of liquid crystal molecules in a middle area along a thickness direction of the liquid crystal layer in the absence of applied voltage and a second border extending along a direction crossing the first border.

8 Claims, 16 Drawing Sheets

270° DIRECTION ← → 90° DIRECTION

70Hz 80Hz 90Hz

70Hz  80Hz

← 270° DIRECTION    90° DIRECTION →

60Hz  70Hz  80Hz  90Hz

100Hz  110Hz  120Hz  130Hz

140Hz  150Hz  160Hz  170Hz

180Hz  190Hz  200Hz  250Hz

60Hz   70Hz   80Hz   90Hz

100Hz   110Hz   120Hz   130Hz

140Hz   150Hz   160Hz   170Hz

180Hz   190Hz   200Hz   250Hz

60Hz 70Hz 80Hz

LIQUID CRYSTAL DISPLAY APPARATUS

CROSS-REFERENCE TO RELATED APPLICATIONS

This application is based on and claims priority of Japanese Patent Applications Nos. 2008-052912 and 2008-076185 filed on Mar. 4, 2008 and Mar. 24, 2008, respectively, the entire contents of which are incorporated herein by reference.

FIELD OF THE INVENTION

The present invention relates to a liquid crystal display apparatus.

DESCRIPTION OF THE RELATED ART

A vertical alignment type liquid crystal cell having liquid crystal molecules aligned vertical to the substrates in the absence of applied voltage provides very good black display in the absence of applied voltage, with the liquid crystal cell being disposed between two polarizer plates cross-Nicol disposed. The liquid crystal cell further provides very good viewing angle characteristics by disposing an optical compensation plate of negative optical anisotropy having a proper parameter between the liquid crystal cell and one or both the upper and lower polarizer plates. A liquid crystal display apparatus using a vertical alignment type liquid crystal cell is disclosed, for example, in JP-A-2005-234254.

Two types of vertical alignment type liquid crystal cell have been proposed, one having a mono domain alignment with a uniform alignment state along a display in-plane direction and the other having a multi domain alignment having a plurality of domains having different alignment states and disposed in a display in-plane. As an alignment process for a mono domain, a rubbing process, an optical alignment process and the like have been proposed, and as an alignment process for multi domains, a method of controlling alignment with an oblique electric field generated by an opening formed through a pixel electrode, and other methods have been proposed.

A vertical alignment type liquid crystal cell of a mono domain vertical alignment type in particular is given a pretilt angle so as to make liquid crystal molecules incline slightly from a substrate normal direction in the absence of applied voltage and to suppress alignment defects in the presence of applied voltage.

A liquid crystal display apparatus having a vertical alignment type liquid crystal cell may be driven by an active matrix driving method or a simple matrix driving method (multiplex driving method). For the active matrix driving method, active elements such as a thin film transistor (TFT) is used.

An optimum bias method is generally used for the multiplex driving method, and a drive waveform used is an A waveform with intra-frame inversion drive (one-line inversion drive), a B waveform with frame inversion drive, a C waveform with N-line inversion drive, and other waveforms. The B waveform is presently used widely for the multiplex driving type liquid crystal display apparatus because the B waveform can reduce a consumption power during driving.

SUMMARY OF THE INVENTION

An object of the present invention is to provide a liquid crystal display apparatus with improved display quality.

According to one aspect of the present invention, there is provided a liquid crystal display apparatus including: a vertical alignment type liquid crystal cell including a first substrate formed with a first electrode, a second substrate formed with a second electrode and facing the first substrate, and a liquid crystal layer sandwiched between the first and second substrate and containing liquid crystal molecules given a pretilt angle; a pair of polarizer plates sandwiching the vertical alignment type liquid crystal cell; and a driver device for applying a voltage of a multiplex driving waveform across the first and second electrodes, wherein in a display in-plane parallel to a surface of the first or second substrate, at least one of the first and second electrodes has a zigzag border alternately coupling a first border perpendicular to display in-plane components of directors of liquid crystal molecules in a middle area along a thickness direction of the liquid crystal layer in the absence of applied voltage and a second border extending along a direction crossing the first border.

DESCRIPTION OF THE PREFERRED EMBODIMENTS

It has been found that a phenomenon that liquid crystal molecule alignment directions shift from desired directions during multiplex driving of a vertical alignment type liquid crystal cell. The present inventors call this phenomenon a dynamic miss alignment (DMA) phenomenon. An area having a low transmissivity is formed in the display pattern by DMA, degrading display uniformity.

Figure 1A:
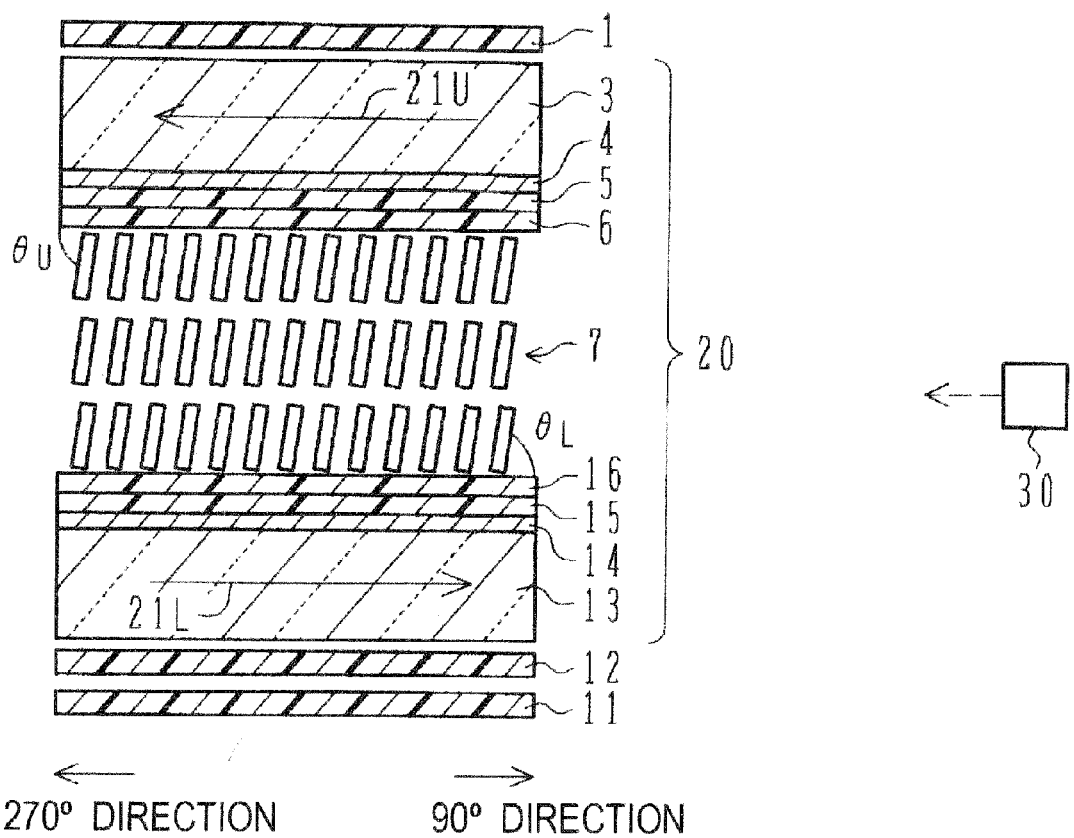
FIG. 1A is a schematic cross sectional view of a liquid crystal display apparatus according to a first embodiment or a first comparative example.
Figure 1B:
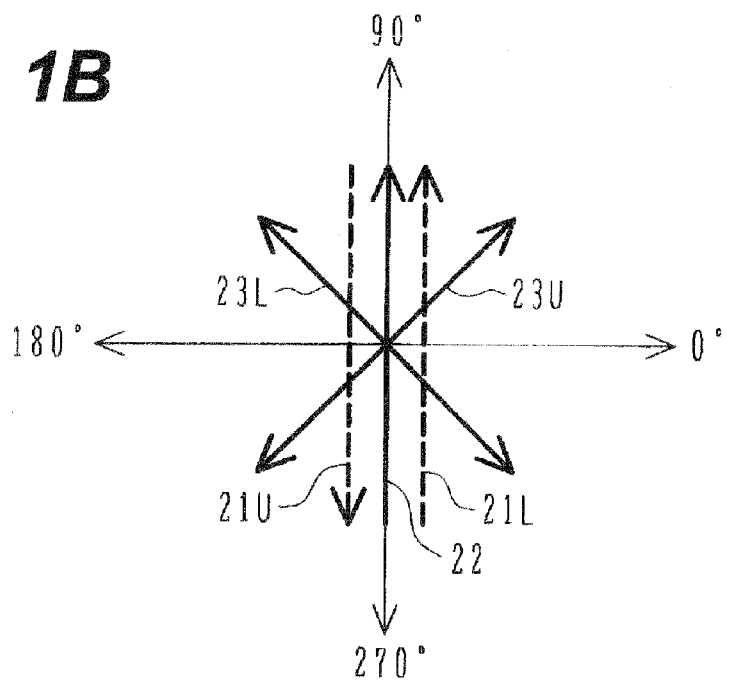
FIG. 1B is a plan view representing an azimuth angle direction of liquid crystal molecules with a pretilt angle at the interfaces with upper and lower alignment films, an azimuth angle direction of directors of liquid crystal molecules in a middle area along a liquid crystal layer thickness direction, and an absorption axis direction of upper and lower polarizer plates, of the first embodiment or first comparative example.

First, with reference to FIGS. 1A and 1B, description will be made on the structure of a liquid crystal display apparatus common to both the first embodiment and first comparative example. FIG. 1A is a schematic cross sectional view of the liquid crystal display apparatus of the first embodiment or first comparative example. FIG. 1B is a plan view representing an azimuth angle direction of liquid crystal molecules with a pretilt angle at the interfaces with upper and lower alignment films, an azimuth angle direction of directors of liquid crystal molecules in a middle area along a liquid crystal layer thickness direction, and an absorption axis direction of upper and lower polarizer plates, respectively of the first embodiment or first comparative example.

An upper glass substrate 3 and a lower glass substrate 13 are disposed in parallel, facing each other. A plane parallel to the surface of the upper glass substrate 3 or lower glass substrate 13 is defined as a display plane. It is assumed that a user observes the apparatus downward. As the liquid crystal display apparatus is viewed from the front side, a visual axis is perpendicular to the display plane.

An azimuth angle is defined in the display plane (refer to FIG. 1B). It is assumed that an angle increases in a counter-clockwise direction. As the liquid crystal display apparatus is viewed from the front side, the right direction is 0° direction (3 o'clock direction), the left direction is 180° direction (9 o'clock direction), the up direction is 90° direction (12 o'clock direction), and the down direction is 270° direction (6 o'clock direction).

In the following, if a direction is represented including a sign, a single azimuth angle is used and represented, for example, by a 90° direction, whereas if a direction is represented not including a sign, two azimuth angles are used and represented, for example, by a 90°-270° direction.

Common electrodes 4 of desired shapes and a vertical alignment film 6 are formed on the inner surface of the upper glass substrate 3, in this order from the substrate side. Segment electrodes 14 of desired shapes and a vertical alignment film 16 are formed on the inner surface of the lower glass substrate 13, in this order from the substrate side. When necessary, segment electrodes may be formed on the upper glass substrate side, and common electrodes may be formed on the lower glass substrate side. The vertical alignment film may be selected properly from a polyimide film, an inorganic film and the like.

In order to prevent a short circuit between the substrates, one of insulating films 5 and 15 may be disposed, the insulating film 5 being disposed between the common electrode 4 and vertical alignment film 6, and the insulating film 15 being disposed between the segment electrode 14 and vertical alignment film 16. In the first embodiment and first comparative example, the insulating films 5 and 15 are not disposed.

A liquid crystal layer 7 made of liquid crystal material having negative dielectric constant anisotropy $\Delta\epsilon$ is sandwiched between the upper vertical alignment film 6 and lower vertical alignment film 16. In the first embodiment and first comparative example, the liquid crystal material used had a dielectric constant anisotropy $\Delta\epsilon$ of −2.2 and a refractive index anisotropy $\Delta n$ of 0.20, and a thickness (cell thickness) of the liquid crystal layer 7 was set to 4.5 μm. A retardation of the liquid crystal layer 7 in a cross section in a thickness direction was set to 900 nm. If the dielectric constant anisotropy $\Delta\epsilon$ of the liquid crystal material is negative, other physical values such as the refractive index anisotropy $\Delta n$ are not specifically limited. The cell thickness is not limited to 4.5 μm, but may be set to any value suitable for applications.

A liquid crystal cell 20 is formed being constituted of the upper and lower glass substrates 3 and 13, common electrode 4, segment electrode 14, upper and lower vertical alignment films 6 and 16 and liquid crystal layer 7, and when necessary, insulating films 5 and 15. A driver 30 applies a voltage having a predetermined drive waveform across the common electrode 4 and segment electrode 14 to conduct multiplex driving (simple matrix driving).

A pretilt angle is given to liquid crystal molecules so that an alignment direction of liquid crystal molecules in the liquid crystal layer 7 slightly inclines from a substrate plane normal direction (vertical direction) in the absence of applied voltage. The pretilt angle is defined as an angle relative to the display plane. As a voltage is applied, liquid crystal molecules fall apart from the display normal direction.

A fall direction of the liquid crystal molecules in the display plane is controlled by an azimuth angle direction of the pretilt angle. A pretilt angle and a given azimuth angle direction are determined by an alignment process. The alignment process may be rubbing, slit alignment, projection alignment, ultraviolet ray alignment or the like.

In the first embodiment and first comparative example, the upper vertical alignment film 6 and lower vertical alignment film 16 were subjected to antiparallel rubbing as the alignment process. With this rubbing, liquid crystal molecules at the interface between the upper vertical alignment film 6 and liquid crystal layer 7 are given a pretilt angle θU with an azimuth angle direction 21U of 270° direction. Liquid crystal molecules at the interface between the lower vertical alignment film 16 and liquid crystal layer 7 are given a pretilt angle θL with an azimuth angle direction of 90° direction opposite to the azimuth angle direction 21U of the pretilt angle θU. The pretilt angles θU and θL were both set to 89.5°. Mono domain alignment is thus obtained having a uniform alignment along the display in-plane direction.

By executing the antiparallel alignment process for liquid crystal molecules at the interfaces with the upper and lower vertical alignment films, liquid crystal molecules in the middle area in the thickness direction of the liquid crystal layer 7 are given a pretilt angle in the azimuth angle 90° direction. Namely, an azimuth angle direction 22 of display in-plane components of directors of liquid crystal molecules in the middle area in the thickness direction of the liquid crystal layer 7 is set to 90° direction in the absence of applied voltage. Namely, a fall azimuth angle direction of liquid crystal molecules in the middle area in the thickness direction of the liquid crystal layer 7 is controlled to be in a 90°-270° direction in the presence of applied voltage.

Liquid crystal molecules near the interfaces with the upper and lower vertical alignment films 6 and 16 are hard to move also in the presence of applied voltage. A change in alignment in the presence of applied voltage is made mainly in liquid crystal molecules near the middle area in the thickness direction of the liquid crystal layer 7. A change in alignment of liquid crystal molecules in the presence of applied voltage will now be described paying attention to liquid crystal molecules near the middle area in the thickness direction of the liquid crystal layer 7. Directors used hereinafter are intended to be the directors of liquid crystal molecules in the middle area in the thickness direction of the liquid crystal layer in the absence of applied voltage.

Polarizer plates 1 and 11 are disposed outside the upper and lower glass substrates 3 and 13, respectively. An absorption axis 23U of the upper polarizer plate 1 is disposed in a 45°-225° direction, and an absorption axis 23L of the lower polarizer plate 11 is disposed in a 135°-315° direction. An angle between the absorption axes 23U and 23L of the polarizer plates (or transmission axes of the polarizer plates) is 90°, and the polarizer plates are cross-Nicol disposed. The polarizer plate may be SHC-13U (dye series) manufactured by Polatechno Co., Ltd. The polarizer plate material may either iodine series or dye series.

An angle between the azimuth angle direction of liquid crystal molecules and the absorption axis of the polarizer plate is represented by a magnitude of 0° to 90°. The azimuth angle direction (90°-270° direction) determined as the fall direction of liquid crystal molecules in the presence of applied voltage is 45° (−45°, if a sign is added) relative to the absorption axis 23U (45°-225° direction) of the upper polarizer plate 1, and also 45° (+45°, if a sign is added) relative to the absorption axis 23L (135°-315° direction) of the lower polarizer plate 11. Namely, the direction determined as the fall direction of liquid crystal molecules is 45° relative to both the absorption axes of the upper and lower polarizer plates 1 and 11.

A viewing angle compensation member 12 laminating three C plates is inserted as an optical compensation plate for compensating a retardation of the liquid crystal layer 7 in a cross section in a thickness direction, between the lower glass substrate 13 and lower polarizer plate 11. Each C plate has a retardation Δth of 220 nm in a cross section in a thickness direction, and an in-plane retardation ΔR is 0 nm. A retardation of the viewing angle compensation member 12 in a cross section in a thickness direction is 660 nm.

The viewing angle compensation member is not limited to the C plate, but when necessary an A plate or a biaxial phase difference plate may be used. If necessary, the viewing angle compensation member may be disposed between the liquid crystal cell and one or both the upper and lower polarizers.

A liquid crystal display apparatus is constituted of the liquid crystal cell 20, upper and lower polarizer plates 1 and 11 sandwiching the liquid crystal cell, driver 30, and when necessary the viewing angle compensation member 12. If a backlight and a reflective member are required, these are disposed under the lower polarizer plate 11.

Next, description will be made on a display operation of a vertical alignment type liquid crystal display apparatus. Since liquid crystal molecules are disposed generally vertically in the absence of applied voltage, the liquid crystal layer 7 does not have refractive index anisotropy in the display plane. Since the upper and lower polarizer plates 1 and 11 are cross-Nicol disposed, the polarization component transmitted through the lower polarizer plate 11 cannot transmit through the upper polarizer plate 1, and black display (dark display) is obtained in the absence of applied voltage.

In the presence of applied voltage, liquid crystal molecules in a voltage applied area sandwiched between upper and lower electrodes fall apart the vertical direction so that refractive anisotropy is formed in the display plane. If the transmission axis of the lower polarizer plate 11 and the fall azimuth angle direction of liquid crystal molecules is neither parallel nor perpendicular to each other in the display plane, the polarization component transmitted through the lower polarizer plate 11 contains both components parallel and perpendicular to the longitudinal directions of liquid crystal molecules. A phase difference is therefore formed between parallel and perpendicular components during transmission through the liquid crystal layer so that a polarization component transmitting through the upper polarization plate 1 is formed. Namely, white display (bright display) can be obtained.

A maximum transmissivity can be obtained particularly when the fall azimuth angle direction of liquid crystal molecules is 45° relative to the transmission axes of the upper and lower polarizer plates cross-Nicol disposed. If the fall azimuth angle direction of liquid crystal molecules is set to the up/down 90°-270° direction, a wide viewing angle display can be obtained having generally the same right/left viewing angle characteristics.

The above-described phase difference is not formed if the transmission axis of the lower polarizer plate 11 and the fall azimuth angle direction of liquid crystal molecules are parallel or perpendicular to each other in the display plane, so that a polarization component to be transmitted through the upper polarizer plate 1 will not be formed. Namely, even if liquid crystal molecules fall in the presence of applied voltage, white display cannot be obtained and the black display is maintained.

Next, drive waveforms of multiplex driving will be described. Waveforms such as A, B and C waveforms are generally used as drive waveforms of multiplex driving of a liquid crystal display apparatus. A multiplex driving method is described, for example, in a paper "Electric Drive of LCDs" by Takashi SUGIYAMA and Shunsuke KOBAYASI, "Display and Imaging" magazine, 1994, Vol. 3, pp. 117-131, published by Science Communications International.

Figure 13A:
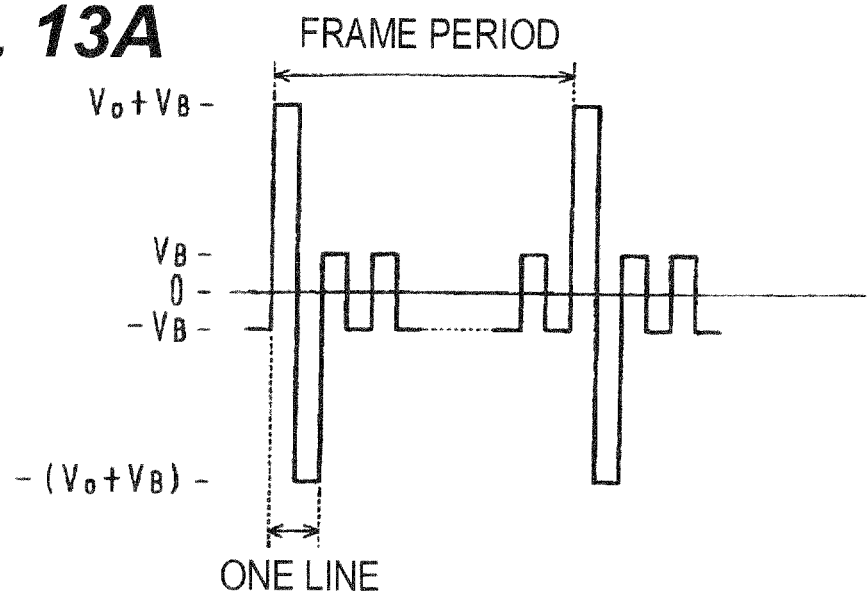
FIGS. 13A to 13C are graphs illustrating A, B and C waveforms of multiplex drive, respectively.
Figure 13B:
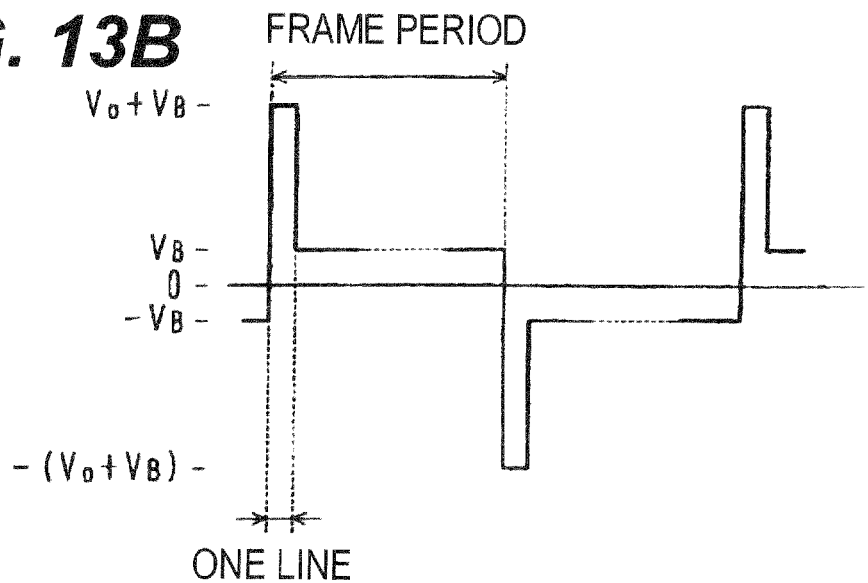
Figure 13C:
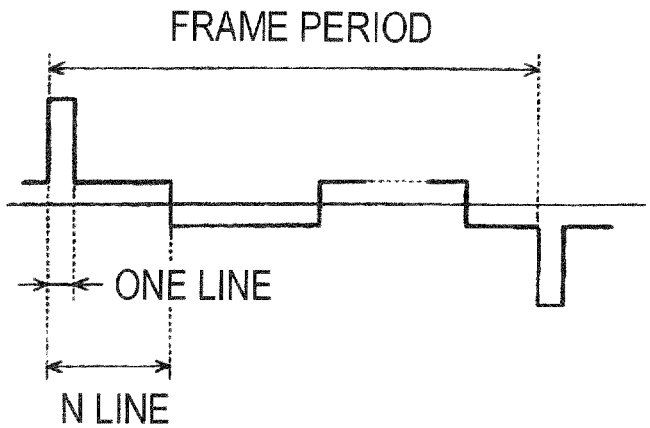

As illustrated in FIG. 13A, the A waveform is a drive waveform of "intra-frame inversion driving (one line inversion driving)" whose polarity is inverted during one line selection (during one common electrode selection). As illustrated in FIG. 13B, the B waveform is a drive waveform of "frame inversion driving)" whose polarity is inverted at each frame. As illustrated in FIG. 13C, the C waveform is a drive waveform, based upon the B waveform, of "N-line inversion driving" whose polarity is inverted at every N lines in order to reduce cross talk of display patterns to be generated during high duty driving. The B waveform is widely used presently for driving a liquid crystal display apparatus of multiplex driving, because a consumption power during driving is minimum.

Next, the liquid crystal display apparatus of the first comparative example will be described further.

Figure 2:
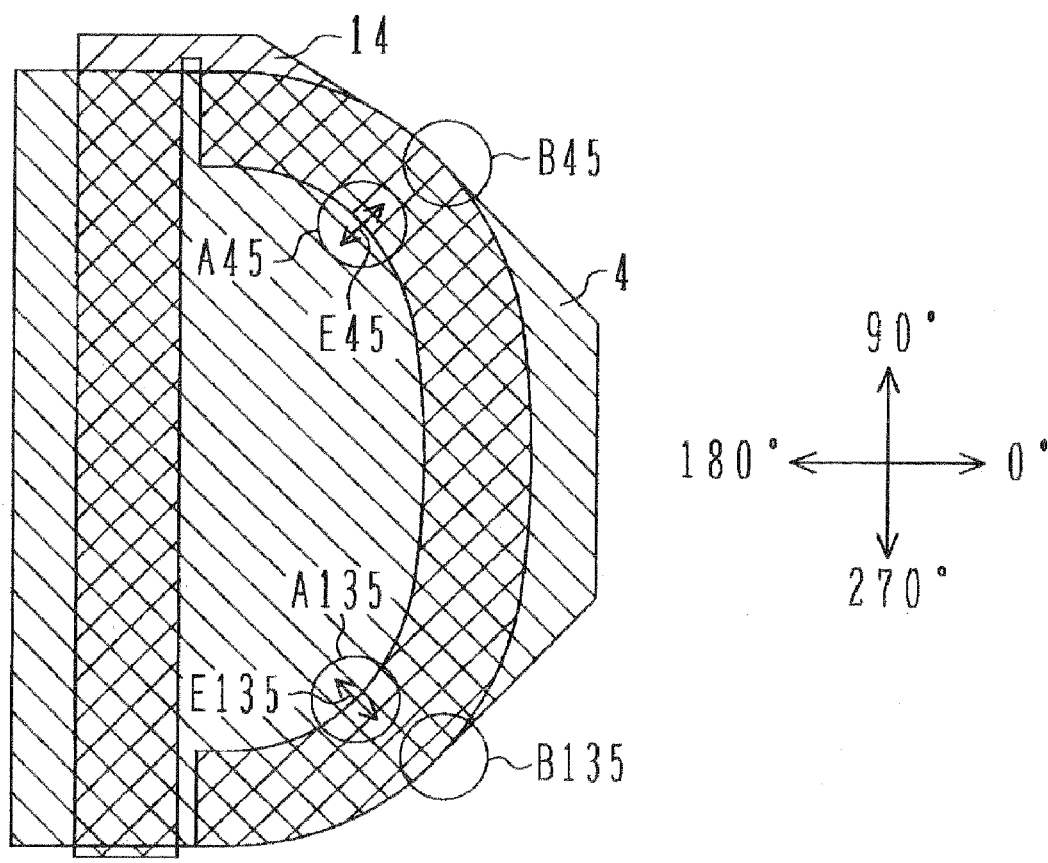
FIG. 2 is a plan view illustrating patterns of a common electrode and a segment electrode of a liquid crystal cell of the first comparative example.

FIG. 2 is a plan view illustrating patterns of a common electrode 4 and a segment electrode 14 of the liquid crystal cell of the first comparative example. The pattern of the common electrode 4 is indicated by left up hatching, and the pattern of the segment electrode 14 is indicated by right up hatching. An area indicated by cross hatching where the common electrode 4 and segment electrode 14 overlap can be applied with a voltage and becomes a display pattern capable of switching between black and white displays. A display pattern of this example is a character "D" which is constituted of a straight vertical line portion and a curved portion.

The liquid crystal display apparatus of the first comparative example was multiplex driven under the conditions of a room temperature, a driving waveform of the B waveform, a 1/64 duty, a 1/9 bias and a voltage ensuring a sufficient contrast. A display state was observed by changing the driving frequency.

Figure 3:
FIG. 3 represents microscopic photographs illustrating display states in a juxtaposed manner at each driving frequency of multiplex drive of the liquid crystal display apparatus of the first comparative example.

FIG. 3 represents microscopic photographs illustrating display states in a juxtaposed manner at driving frequencies of 70 Hz, 80 Hz and 90 Hz from the left side. At the driving frequencies of 70 Hz and 80 Hz, a black shaded area can be observed in a display pattern of white display. The shaded area is observed in both the vertical line portion and curved portion. There is a tendency that the shaded area reduces as the driving frequency becomes high. At the driving frequency of 90 Hz, the shaded areas in both the vertical line portion and curved portion disappear and good white display is presented.

There arises a problem that a shaded area appears in a display pattern of the vertical alignment type liquid crystal display apparatus under multiplex driving, particularly at low frequencies, and display uniformity is degraded. The reason for this may be ascribed to that an alignment direction of liquid crystal molecules under multiplex driving shifts from the direction determined by the alignment process and an area of a low transmissivity is formed. The present inventors call this phenomenon that an alignment direction of liquid crystal molecules under multiplex driving shifts from the direction determined by the alignment process, a dynamic miss alignment (DMA) phenomenon. The shaded area caused by DMA is visually recognized not only by observation from the front side of the liquid crystal display apparatus but also by observation at a swung viewing angle, and degrades a display quality.

The shaded area caused by DMA is formed in various areas (DMA occurs in various areas), and it is difficult to anticipate how shaded areas are distributed in a display pattern. However, it has been found that the shaded area is visually recognized remarkably near a portion (a portion indicated by a circle A45 in the example shown in FIG. 2) where an extension direction of a border of a display pattern is 45° relative to the director azimuth angle direction (90°-270° direction in the first comparative example), and near a portion (a portion indicated by a circle A135 in the example shown in FIG. 2) where an extension direction is 135°. As shown in FIG. 3, the shaded area is formed near the portion indicated by the circle A45 in FIG. 2.

In the area indicated by the circle A45 or A135 in FIG. 2, the border portion of the segment electrode 14 is disposed, whereas not the border portion but the flat portion of the common electrode 4 is disposed. In the area where the border portion and flat portion of the electrodes face each other, an oblique electric field is likely to be generated having display in-plane component perpendicular to the border extension direction. In the area indicated by the circle A45, an oblique electric field having component E45 in the 45°-225° direction is likely to be formed, whereas in the area indicated by the circle A135, an oblique electric field having component E135 in the 135°-315° direction is likely to be formed.

Liquid crystal molecules fall ideally in the 90°-270° direction determined by the alignment process. However, under the influence of the oblique electric field, liquid crystal molecules are likely to fall in the 45°-225° direction near the border indicated by the circle A45, and in the 135°-315° direction near the border indicated by the circle A135.

If liquid crystal molecules fall in the 45°-225° direction or 135°-315° direction, there arises a relation that the lower polarizer plate transmission axis and the liquid crystal molecule fall azimuth angle are parallel or perpendicular to each other in the display plane. Therefore, as described above, even if liquid crystal molecules fall in the presence of applied voltage, white display cannot be obtained and the black display remains. It can be considered that this is a reason why the shaded area caused by DMA is likely to be formed, for example, near the portion indicated by the circle A45 in FIG. 2.

In the area indicated by the circle A45 in FIG. 2, the contour of the display pattern is defined by the border of the segment electrode 14. On the other hand, in a border portion (indicated by a circle B45) of the segment electrode 14 facing the border portion indicated by the circle A45 in FIG. 2 along a width direction of the curved portion, the border of the segment electrode 14 is coincident with the border of the common electrode 4, and the contour of the display pattern is defined by both the borders of both the electrodes 4 and 14. In the area indicated by the circle B45, although the electrode border extension direction is approximately the 135°-315° direction, an oblique electric field is hard to be generated because the borders of both the electrodes are coincident.

Similarly, in the border portion of the display pattern indicated by a circle B135 facing the border portion indicated by the circle A135 in FIG. 2, although the electrode border extension direction is approximately the 45°-225° direction, an oblique electric field is hard to be generated because the borders of both the electrodes are coincident.

At upper and lower borders and the like of the vertical line portion, the border of the common electrode 4 is disposed, whereas the flat portion of the segment electrode 14 is disposed, a contour of the display pattern is defined by the border of the common electrode 4.

Next, the liquid crystal display apparatus of the first embodiment will be described further.

Figure 4:
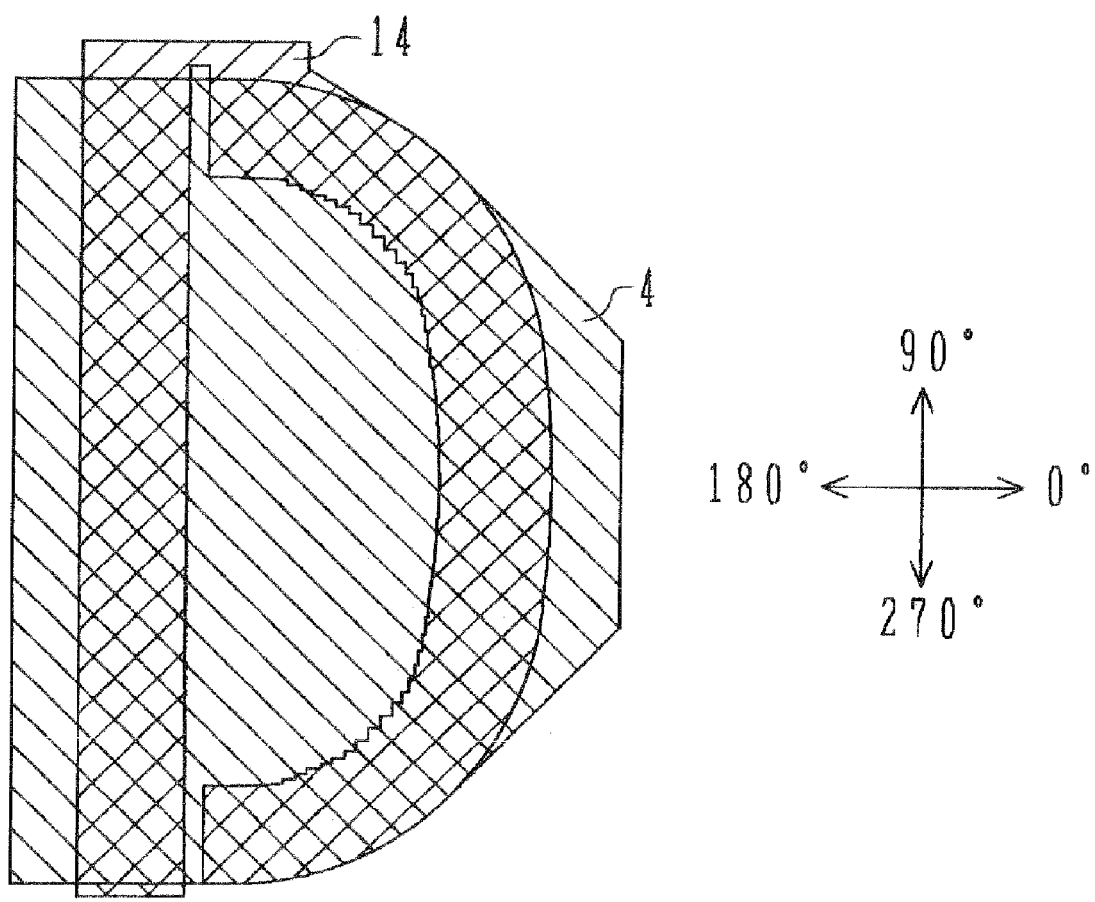
FIG. 4 is a plan view illustrating patterns of a common electrode and a segment electrode of a liquid crystal cell of the first embodiment.

FIG. 4 is a plan view illustrating the patterns of the common electrode 4 and segment electrode 14 of the liquid crystal cell of the first embodiment. The pattern of the common electrode 4 is indicated by left up hatching, and the pattern of the segment electrode 14 is indicated by right up hatching. An area indicated by cross hatching where the common electrode 4 and segment electrode 14 overlap is a display pattern representative of a character "D" similar to the first comparative example.

As described earlier, it has been found that a shaded area caused by DMA is likely to be formed near an electrode border portion (the portion indicated by the circle A45 in FIG. 2) where an oblique electric field is likely to be generated and an extension direction of the border is 45° relative to the director azimuth angle direction of 90°-270° determined by the alignment process, and near an electrode border portion (the portion indicated by the circle A135 in FIG. 2) where an extension direction is 135°.

In the first embodiment, a portion near such border of the segment electrode 14 has a zigzag shape alternately coupling a border (called a vertical portion) perpendicular to the display in-plane component of the director and a border (called parallel portion) parallel to the display in-plane component of the director. Namely, a border extending in the 0°-180° direction and a border extending in the 90°-270° direction are alternately disposed to form the zigzag border. There is no electrode border portion having an extension angle of 45° or 135° relative to the display in-plane component of the director and being likely to generate an oblique electric field. A length of each vertical portion of the zigzag border is set to about 40 μm, and a length of each parallel portion is also set to about 40 μm.

Similar to the first comparative example, the liquid crystal display apparatus of the first embodiment was multiplex driven under the conditions of a room temperature, a driving waveform of the B waveform, a 1/64 duty, a 1/9 bias and a voltage ensuring a sufficient contrast. A display state was observed by changing the driving frequency.

Figure 5:
FIG. 5 represents microscopic photographs illustrating display states in a juxtaposed manner at each driving frequency of multiplex drive of the liquid crystal display apparatus of the first embodiment.

FIG. 5 represents microscopic photographs illustrating display states in a juxtaposed manner at driving frequencies of 70 Hz and 80 Hz from the left side. At the driving frequency of 70 Hz, a black shaded area caused by DMA is observed in both the vertical line portion and curved portion. However, at the driving frequency of 80 Hz, the shaded areas in both the vertical line portion and curved portion disappear and good white display is presented. It was confirmed that the shaded area did not appear at a frequency not lower than 80 Hz. As the liquid crystal display is driven at a frequency not lower than the lowest driving frequency at which the shaped area disappears, good display state can be obtained.

In the first embodiment, the above-described zigzag electrode border portion was adopted, and the driving frequency at which the shaded area caused by DMA disappears was able to be lowered. It can also be considered that the zigzag electrode portion suppresses DMA itself at the lower driving frequency.

Since the oblique electric field generated at the vertical portion of the zigzag electrode border portion has display in-plane component in the 90°-270° direction, this electric field operates to fall liquid crystal molecules in the direction determined by the alignment process. On the other hand, since the oblique electric field generated at the parallel portion has display in-plane component in the 0°-180° direction, this electric field operates to fall liquid crystal molecules in the direction perpendicular to the direction determined by the alignment process. In this case, the fall direction of liquid crystal molecules is 45° relative to the transmission axes of the upper and lower polarizer plates cross-Nicol disposed so that a large transmissivity is obtained. It is presumed that this function of the zigzag electrode border portion is one factor of lowering the driving frequency at which the shaded area caused by DMA disappears.

It has been found that the effects that the shaded area becomes hard to appear at the lower driving frequency (i.e., the effects that DMA becomes hard to appear) are not limited only to an area near the zigzag electrode border portion but are applied to all area of the display pattern. In the first embodiment, in addition to the curved portion adopting the zigzag border, the driving frequency at which the shaded area disappears was able to be lowered also in the vertical line portion.

In the first embodiment, also a liquid crystal display apparatus was manufactured having a length of 20 μm of each vertical portion and each parallel portion of the zigzag electrode border portion. Similar effects to those of the apparatus having a length of 40 μm were confirmed.

If the size of the zigzag shape is too small, an etching precision of the zigzag pattern lowers and corners of the zigzag shape are rounded. If the size of the zigzag shape is too large, the zigzag shape is visually recognized, and the display pattern becomes different from the original display pattern. Generally, display defects of a liquid crystal display apparatus are visually recognized at a size not shorter than 100 μm. A length of each vertical portion and each parallel portion is preferably set in a range not shorter than 20 μm and shorter than 100 μm.

In the example described above, the zigzag border was adopted to the curved portion of the character "D". When the zigzag border is applied to a general display pattern, it is effective if the zigzag border is applied to the border portion whose extension direction is neither vertical nor parallel to the display in-plane component of the director, in a desired display pattern presented to an observer (display pattern whose fine zigzag border is observed linearly). The zigzag portion is preferably applied to the border portion whose extension angle is 45°, 135° (225°, 315°) relative to the display in-plane component of the director.

It is valid even if an angle between the vertical portion of the zigzag border and the display in-plane component of the director is shifted by about 10° from 90°. Basing upon this, "vertical to the display in-plane component of the director" is defined as an angle in a range of 80° to 100° relative to the display in-plane component of the director. Further, it is valid even if an angle between the parallel portion of the zigzag border and the display in-plane component of the director is shifted by about 10° from 0°. Basing upon this, "parallel to the display in-plane component of the director" is defined as an angle in a range of −10° to 10° relative to the display in-plane component of the director.

Although description has been made on an example that the zigzag portion is applied to the border of the segment electrode, it has been confirmed that the zigzag portion applied to the border of the common electrode depending upon the electrode pattern presents similar effects. If necessary, it is possible to adopt an arrangement that a zigzag electrode border portion of the segment electrode and a zigzag electrode border portion of the common electrode are used in a mixed manner.

As described above, the effects that the zigzag electrode border portion lowers the driving frequency at which the shaded area caused by DMA disappears are applied to a broad area of the display pattern. Therefore, if at least a portion of the electrode border having an extension direction of 45° or 135° relative to the azimuth angle direction of the director determined by the alignment process and being likely to generate an oblique electric field is changed to the zigzag border, the effects of suppressing the shaded area in an area broader than the zigzag border forming area can be expected. The zigzag border portions may be discretely disposed on the borders of a display pattern.

In the above description, the zigzag border is formed by alternately disposing the borders perpendicular and parallel to the display in-plane component of the director If the zigzag border is formed by alternately coupling a border vertical to the display in-plane component of the director and a border extending in the direction crossing the vertical border direction, DMA can be suppressed by controlling the alignment direction of liquid crystal molecules in such a manner that the oblique electric field generated at the vertical border portion makes liquid crystal molecules fall in the direction parallel to the display in-plane component of the director.

If liquid crystal molecules are easy to move in the azimuth angle direction, the influence of the oblique electric field is likely to occur, and it can be considered that DMA and the shaded area caused by DMA are applied to a broad area. The phenomenon that liquid crystal molecules are easy to move in the azimuth angle direction occurs in a case wherein a pretilt angle is almost vertical and anchoring in the azimuth angle direction is weak, in a case wherein a viscosity of the liquid crystal layer is low and a response is good, and in other cases. The good response occurs, for example, in a case wherein low viscosity liquid crystal material is used, in a case wherein a cell thickness is thin, in a case wherein an operation temperature is high, and in other cases. If chiral material is added to the liquid crystal layer, liquid crystal molecules are easy to move in an azimuth angle direction.

For example, the good response occurs at a viscosity not higher than about 50 mm/s (for high viscosity) and at a viscosity not higher than about 30 mm/s (for low viscosity), both at the room temperature, or a pretilt angle not smaller than 85°, preferably not smaller than 89°.

Figure 6A:
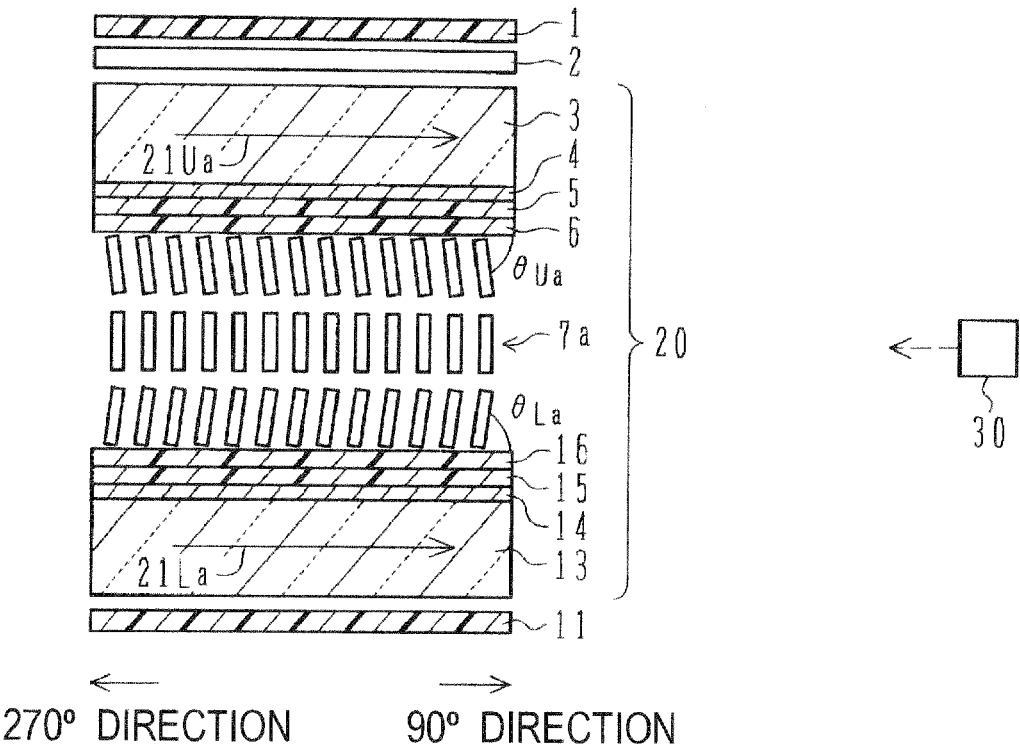
FIG. 6A is a schematic cross sectional view of a liquid crystal display apparatus according to a second embodiment or a second comparative example.
Figure 6B:
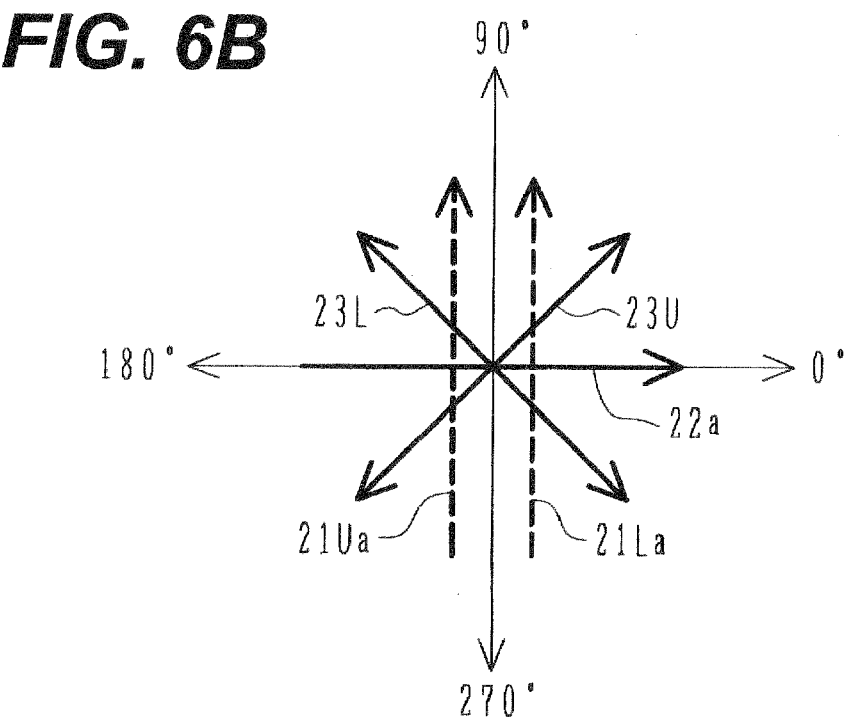
FIG. 6B is a plan view representing an azimuth angle direction of liquid crystal molecules with a pretilt angle at the interfaces with upper and lower alignment films, an azimuth angle direction of directors of liquid crystal molecules in a middle area along a liquid crystal layer thickness direction, and an absorption axis direction of upper and lower polarizer plates, of the second embodiment or second comparative example.

Next, with reference to FIGS. 6A and 6B, description will be made on the structure of a liquid crystal display apparatus common to both the second embodiment and second comparative example. FIG. 6A is a schematic cross sectional view of the liquid crystal display apparatus of the second embodiment or second comparative example. FIG. 6B is a plan view representing an azimuth angle direction of liquid crystal molecules with a pretilt angle at the interfaces with upper and lower alignment films, an azimuth angle direction of directors, and an absorption axis direction of upper and lower polarizer plates.

In the second embodiment and second comparative example, parallel (including a sign) rubbing was performed for an upper vertical alignment film 6 and a lower vertical alignment film 16. With this rubbing process, liquid crystal molecules at the interface between the upper vertical alignment film 6 and liquid crystal layer 7 are given a pretilt angle θUa with an azimuth angle direction 21Ua of 90°, and liquid crystal molecules at the interface between the lower vertical alignment film 16 and liquid crystal layer 7 are given a pretilt angle θLa with the same azimuth angle direction 21La of 90° as that of the azimuth angle direction 21Ua of the pretilt angle θUa. Both the pretilt angles θUa and θLa were set to 89.5°. The mono domain alignment is provided having a uniform alignment state in the display in-plane direction.

Similar to the first embodiment and first comparative example, in the second embodiment and second comparative example, a liquid layer 7a is made of liquid crystal material having negative dielectric constant anisotropy Δε of −2.2 and a refractive index anisotropy Δn of 0.20, and further added with chiral agent. As the chiral agent, right-handed chiral agent R-811 manufactured by Merck Japan was added by 1% to the liquid material so as to set a relation d/p to 0.5 where d is a cell thickness (4.5 μm) and p is a chiral pitch. The liquid crystal layer has a right-handed twist structure having a twist angle of 180°.

By performing parallel rubbing for the upper and lower vertical alignment films 6 and 16 and adding right-handed chiral agent as described above, liquid crystal molecules in the middle area of the liquid crystal layer 7a along the thickness direction are given a pretilt angle in the azimuth angle direction of 0°. Namely, the azimuth angle direction 22a of display in-plane component of the director is set to 0°. In other words, the fall azimuth angle direction of liquid crystal molecules in the presence of applied voltage is controlled to be the 0°-180° direction. In the second embodiment and second comparative example, the process of parallel rubbing for the upper and lower vertical alignment films and adding chiral agent may be considered as an alignment process for determining a director direction.

In the second embodiment and second comparative example, although the fall azimuth angle direction is the 0°-180° direction, similar to the first embodiment and first comparative example, the fall azimuth angle direction of liquid crystal molecules is 45° relative to the transmission axis (or absorption axis) of the upper polarizer plate 1 and also 45° relative to the transmission axis (or absorption axis) of the lower polarizer plate 11, so that the transmissivity is maximized.

Next, the liquid crystal display apparatus of the second comparative example will be described further. The second comparative example has a common electrode 4 and a segment electrode 14 without the zigzag border, and displays a character "D".

The liquid crystal display apparatus of the second comparative example was multiplex driven under the conditions of a room temperature, a driving waveform of the B waveform, a ¼ duty and a ⅓ bias. A display state was observed by changing the driving frequency.

Figure 7A:
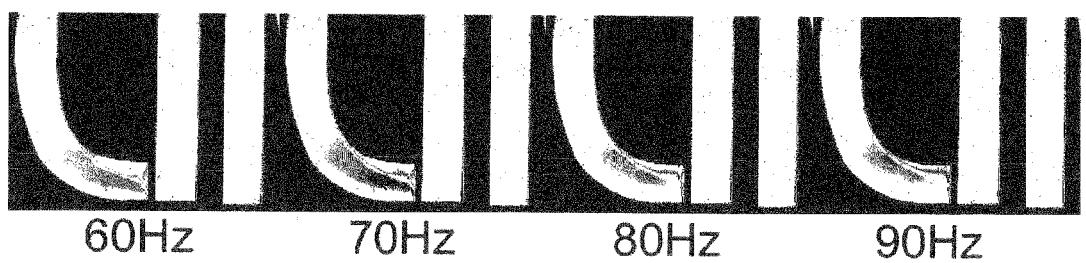
FIGS. 7A to 7D are microscopic photographs illustrating display states in a juxtaposed manner at each driving frequency of multiplex drive of the liquid crystal display apparatus of the second comparative example.
Figure 7B:
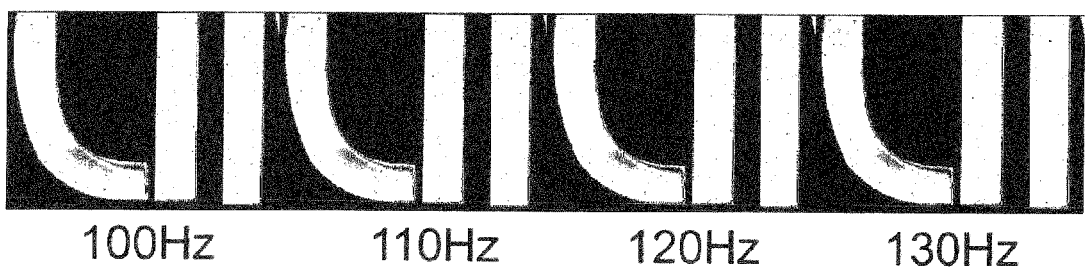
Figure 7C:
Figure 7D:
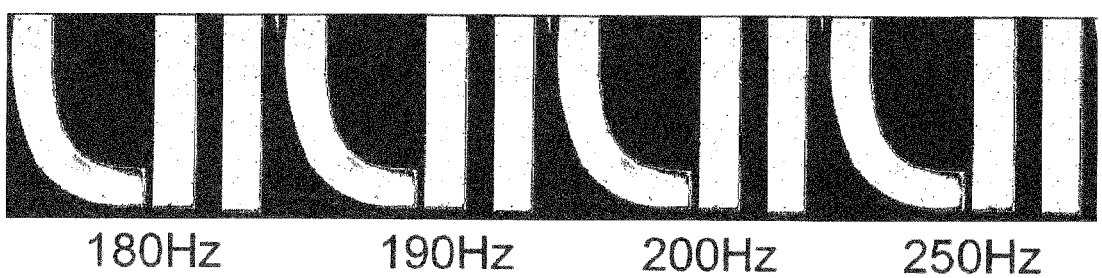

FIG. 7A represents microscopic photographs illustrating display states in a juxtaposed manner at driving frequencies of 60 Hz, 70 Hz, 80 Hz and 90 Hz from the left side. FIG. 7B represents microscopic photographs illustrating display states in a juxtaposed manner at driving frequencies of 100 Hz, 110 Hz, 120 Hz and 130 Hz from the left side. FIG. 7C represents microscopic photographs illustrating display states in a juxtaposed manner at driving frequencies of 140 Hz, 150 Hz, 160 Hz and 170 Hz from the left side. FIG. 7D represents microscopic photographs illustrating display states in a juxtaposed manner at driving frequencies of 180 Hz, 190 Hz, 200 Hz and 250 Hz from the left side. In these photographs, the right and left sides of the character "D" is reversed.

Also in the second comparative example added the chiral agent, the shaded area caused by DMA was observed. However, the occurrence pattern of shaded areas was different from that of the first comparative example (and first embodiment) not added chiral agent. In the second comparative example, although the shaded area was observed in the curved portion of the display pattern of the character "D", the shaded area was not observed in the vertical line portion. This suggests that although the shaded area becomes likely to be formed because of addition of the chiral agent, there is a possibility that spread of shaded areas is suppressed.

The shaded areas were observed clearly at the driving frequencies of 60 Hz to 170 Hz. As the driving frequency becomes higher, the shaded area reduces. At the driving frequency not lower than 180 Hz, the shaded area was observed scarcely, and good white display was obtained.

Next, the liquid crystal display apparatus of the second embodiment will be described further. The second embodiment has a common electrode 4 and a segment electrode 14 having a pattern similar to that of the first embodiment, and displays a character "D". A zigzag border is formed on the segment electrode 14.

In the first embodiment, the director azimuth angle direction was the 90°-270° direction, and the zigzag border was formed at the border perpendicular to the director azimuth angle direction (vertical portion) and at the border parallel to the director azimuth angle direction (parallel portion). In the second embodiment, since the director azimuth angle direction is the 0°-180° direction, the vertical portion of the first embodiment corresponds to the parallel portion parallel to the director azimuth angle direction, whereas the parallel portion of the first embodiment corresponds to the vertical portion perpendicular to the director azimuth angle direction. However, similar to the first embodiment, the zigzag border is formed at borders perpendicular and parallel to the director azimuth angle direction.

Similar to the second comparative example, the liquid crystal display apparatus of the second embodiment was multiplex driven under the conditions of a room temperature, a driving waveform of the B waveform, a ¼ duty and a ⅓ bias. A display state was observed by changing the driving frequency.

Figure 8A:
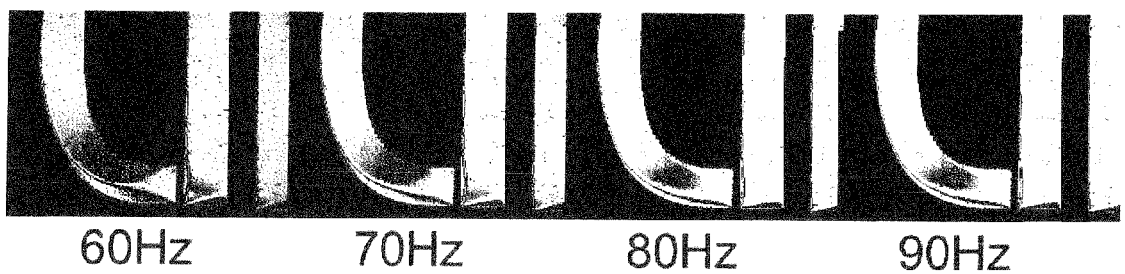
FIGS. 8A to 8D are microscopic photographs illustrating display states in a juxtaposed manner at each driving frequency of multiplex drive of the liquid crystal display apparatus of the second embodiment.
Figure 8B:
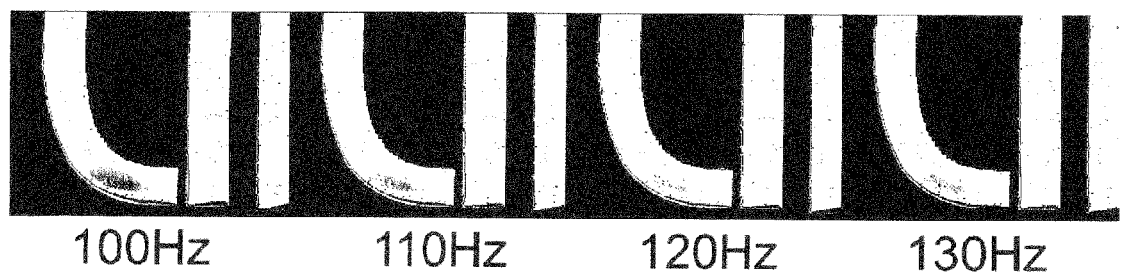
Figure 8C:
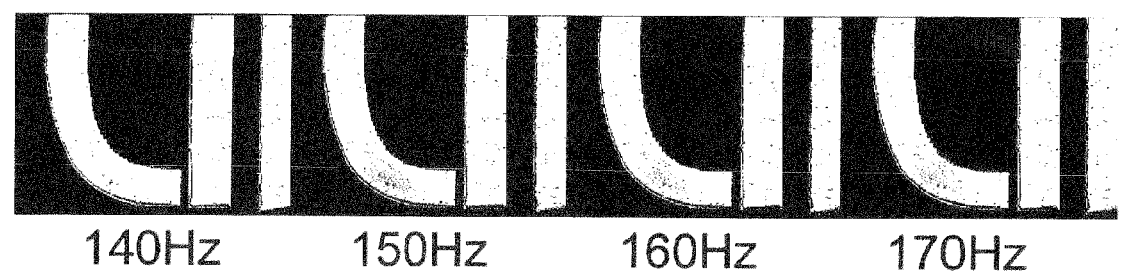
Figure 8D:
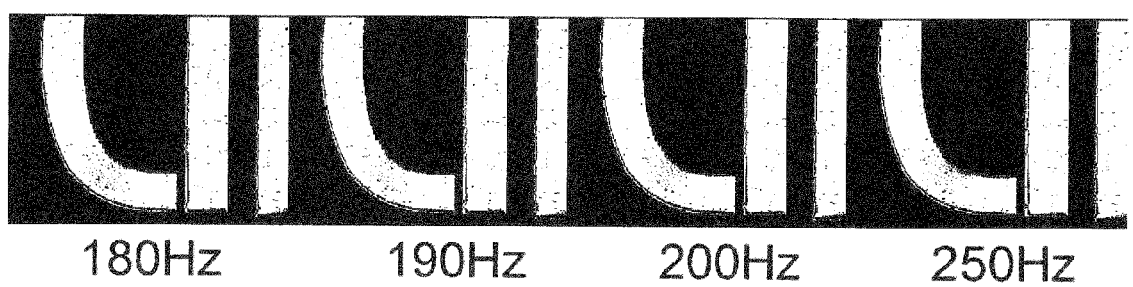

FIG. 8A represents microscopic photographs illustrating display states in a juxtaposed manner at driving frequencies of 60 Hz, 70 Hz, 80 Hz and 90 Hz from the left side. FIG. 8B represents microscopic photographs illustrating display states in a juxtaposed manner at driving frequencies of 100 Hz, 110 Hz, 120 Hz and 130 Hz from the left side. FIG. 8C represents microscopic photographs illustrating display states in a juxtaposed manner at driving frequencies of 140 Hz, 150 Hz, 160 Hz and 170 Hz from the left side. FIG. 8D represents microscopic photographs illustrating display states in a juxtaposed manner at driving frequencies of 180 Hz, 190 Hz, 200 Hz and 250 Hz from the left side. In these photographs, the right and left sides of the character "D" is reversed.

Similar to the second comparative example, also in the second embodiment, the shaded area caused by DMA was observed clearly in the curved portion of the display pattern of the character "D" although it was observed scarcely in the vertical line portion.

The shaded area was observed clearly at the driving frequencies of 60 Hz to 110 Hz. Also in the second embodiment, there was a tendency that as the driving frequency becomes higher, the shaded area reduces. At the driving frequency not lower than 120 Hz, the shaded area was observed scarcely, and good white display was obtained. Similar to the first embodiment, also in the second embodiment added the chiral agent, the zigzag electrode border portion was able to lower the driving frequency at which the shaded area caused by DMA is not observed.

In the second embodiment, the director azimuth angle direction is set to 0° by adding the chiral agent. Namely, the fall direction of liquid crystal molecules is set to the 0°-180° direction. The oblique electric field generated at the vertical portion, of the zigzag electrode border portion, relative to the director azimuth angle direction has 0°-180° component, and functions to fall liquid crystal molecules along the direction determined by the alignment process. On the other hand, the oblique electric field generated at the parallel portion, of the zigzag electrode border portion, relative to the director azimuth angle direction has 90°-270° component, and functions to fall liquid crystal molecules along the direction perpendicular to the direction determined by the alignment process. However, the fall direction of liquid crystal molecules is 45° relative to the transmission axes of the upper and lower polarizer plates cross-Nicol disposed so that a large transmissivity is obtained.

Similar to the first embodiment, it is presumed that this function of the zigzag electrode border portion is one factor of lowering the driving frequency at which the shaded area caused by DMA disappears. It can be considered that similar effects can be obtained even if the director azimuth angle direction is set to 180° by using left-handed chiral agent because the fall direction of liquid crystal molecules is the 0°-180° direction.

Next, description will be made on the third embodiment and third comparative example. Similar to the first embodiment and first comparative example, in the third embodiment and third comparative example, liquid crystal material not added chiral agent was used, and an antiparallel alignment process was performed to manufacture a vertical alignment type liquid crystal display apparatus. The third embodiment and third comparative example used a dot matrix pattern as a display pattern.

Figure 9A:
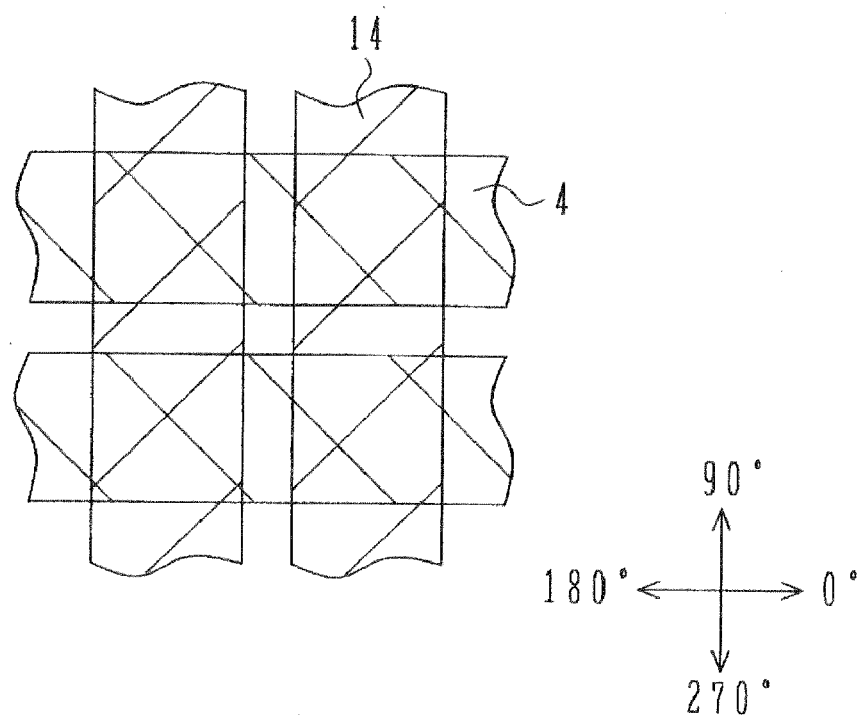
FIG. 9A is a plan view illustrating patterns of common and segment electrodes of a liquid crystal cell of the third comparative example.

FIG. 9A is a plan view illustrating the patterns of common electrodes 4 and segment electrodes 14 of a liquid crystal cell of the third comparative example. The pattern of the common electrode 4 is indicated by left up hatching, and the pattern of the segment electrode 14 is indicated by right up hatching.

A plurality of common electrodes 4 each having a stripe shape elongated in the 0°-180° direction are juxtaposed in the 90°-270° direction, and a plurality of segment electrodes 14 each having a stripe shape elongated in the 90°-270° direction are juxtaposed in the 0°-180° direction. A square dot area (pixel) superposing both the electrodes and indicated by cross hatching constitutes a display pattern.

Figure 9B:
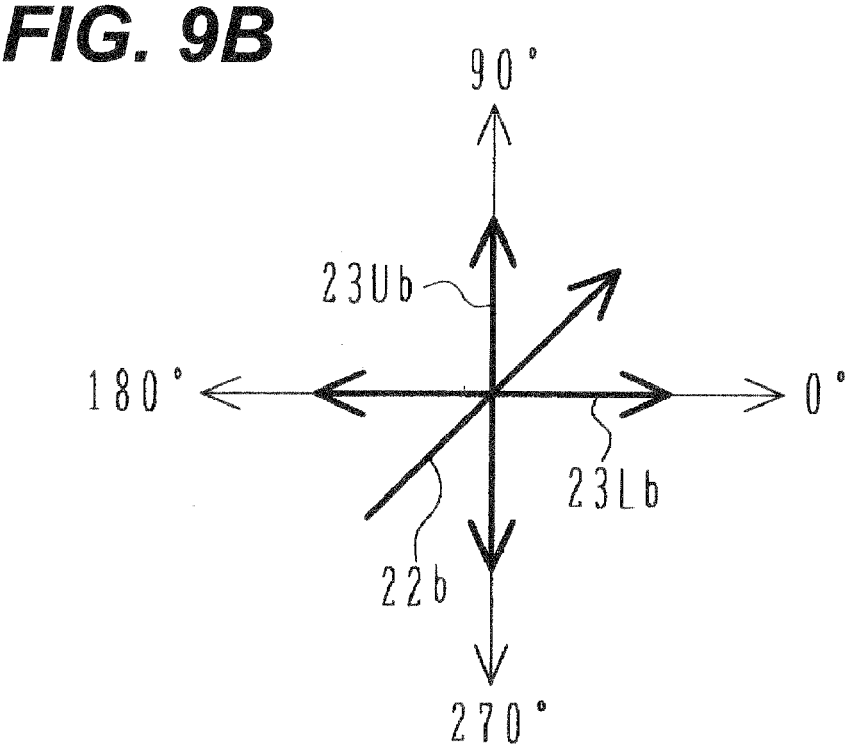
FIG. 9B is a plan view illustrating an azimuth angle direction of directors and an absorption axis direction of upper and lower polarizer plates, of the third comparative example (or the third embodiment).

As shown in FIG. 9B, in the third embodiment and third comparative example, an absorption axis 23Ub of an upper polarizer plate 1 is disposed along an up/down 90°-270° direction, and an absorption axis 23Lb of a lower polarizer plate 11 is disposed along a right/left 0°-180° direction. An angle between the absorption axes 23Ub and 23Lb of the polarizer plates is 90°, and the polarizer plates are cross-Nicol disposed.

An azimuth angle direction 22b of display in-plane component of the director is set to 45° so that a fall azimuth angle direction of liquid crystal molecules in the presence of applied voltage is restricted to the 45°-225° direction. Similar to the first embodiment and first comparative example, the fall azimuth angle direction of liquid crystal molecules is 45° relative to the absorption axis (or transmission axis) of the upper polarizer plate 1, and is also 45° relative to the absorption axis (or transmission axis) of the lower polarizer plate 11. A transmissivity is therefore maximized.

By setting the transmission axes of the upper and lower polarizer plates to the up/down and right/left directions, black display particularly at a deep viewing angle becomes good for observation along the up/down direction and right/left direction.

In the third comparative example, borders of each dot of the display pattern along the 90°-270° direction are defined by the borders of the segment electrode 14, and borders of each dot along the 0°-180° direction are defined by the borders of the segment electrode 4. An oblique electric field is likely to be generated at these borders. Since both the borders along the 90°-270° direction and 0°-180° direction have an angle of 45° or 135° relative to the fall azimuth angle direction of liquid crystal molecules, it can be considered that the shaded area caused by DMA is likely to be formed particularly near these borders.

The liquid crystal display apparatus of the third comparative example was multiplex driven under the conditions of a room temperature, a driving waveform of the B waveform, a 1/64 duty and a ⅑ bias. A display state was observed by changing the driving frequency.

Figure 10:
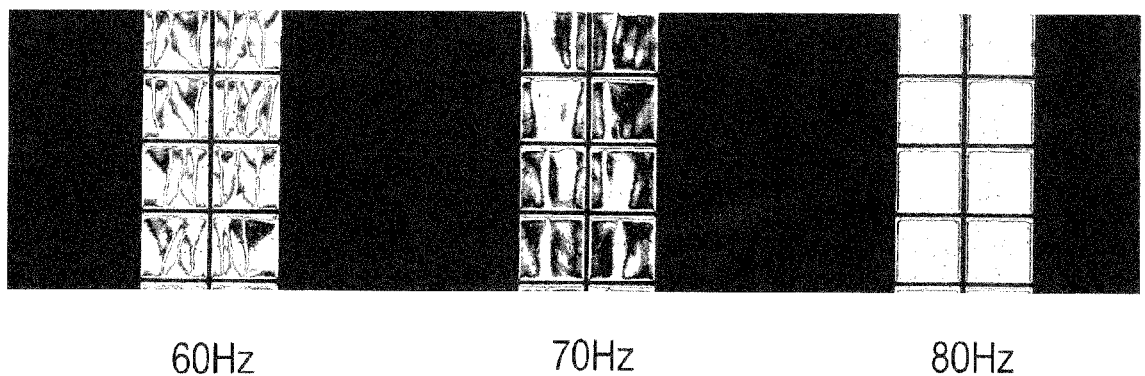
FIG. 10 represents microscopic photographs illustrating display states in a juxtaposed manner at each driving frequency of multiplex drive of the liquid crystal display apparatus of the third comparative example.

FIG. 10 represents microscopic photographs illustrating display states in a juxtaposed manner at driving frequencies of 60 Hz, 70 Hz and 80 Hz from the left side. The shaded area was observed at the driving frequencies of 60 Hz and 70 Hz, and as the driving frequency was raised to 80 Hz, the shaded area disappeared.

Figure 11:
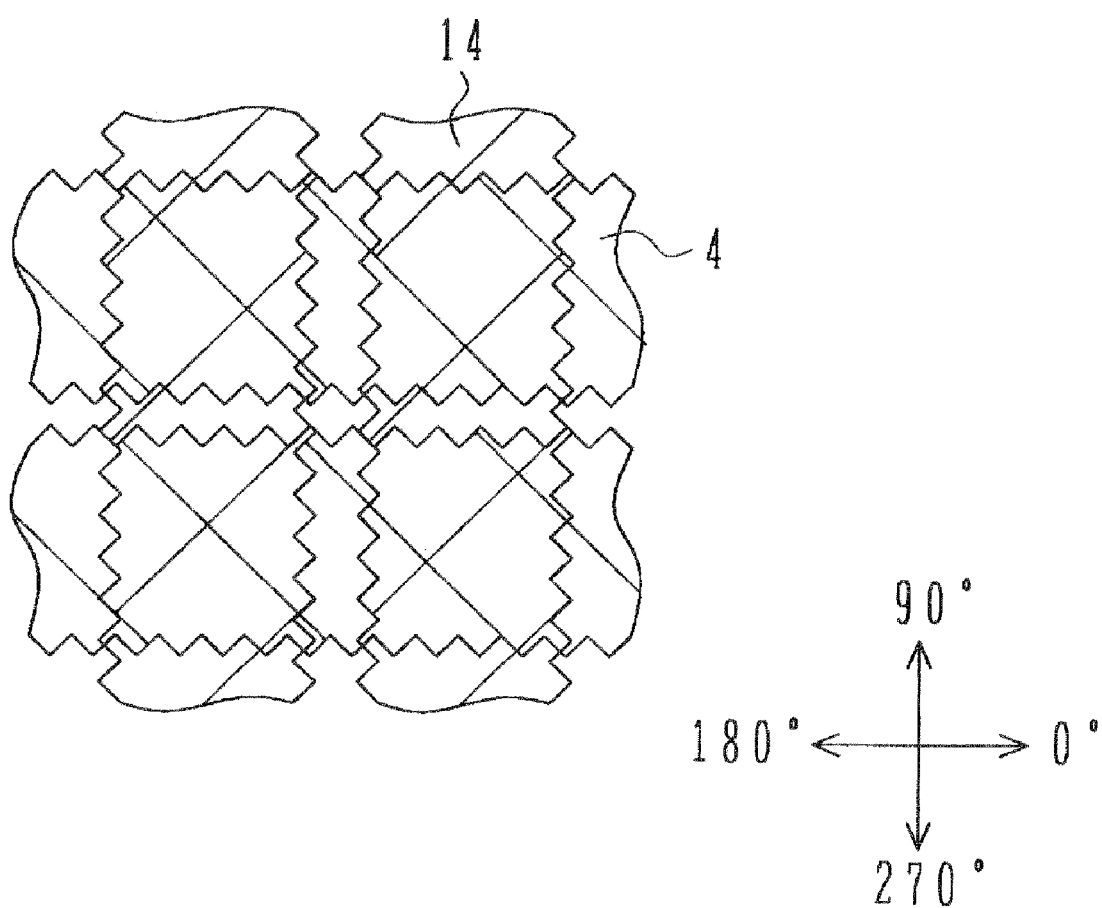
FIG. 11 is a plan view illustrating patterns of common and segment electrodes of a liquid crystal cell of the third embodiment.

FIG. 11 is a plan view illustrating the patterns of common electrodes 4 and segment electrodes 14 of a liquid crystal cell of the third embodiment. The pattern of the common electrode 4 is indicated by left up hatching, and the pattern of the segment electrode 14 is indicated by right up hatching.

In the third embodiment, the borders of the common electrode 4 and segment electrode 14 of the third comparaexample were changed to the zigzag borders alternately coupling borders perpendicular and parallel to the display in-plane component of the director. Namely, the zigzag border is constituted of alternately coupled borders extending along the 45°-225° direction and 135°-315° direction.

The liquid crystal display apparatus of the third embodiment was multiplex driven under the conditions of a room temperature, a driving waveform of the B waveform, a 1/64 duty and a 1/9 bias. A display state was observed by changing the driving frequency.

Figure 12:
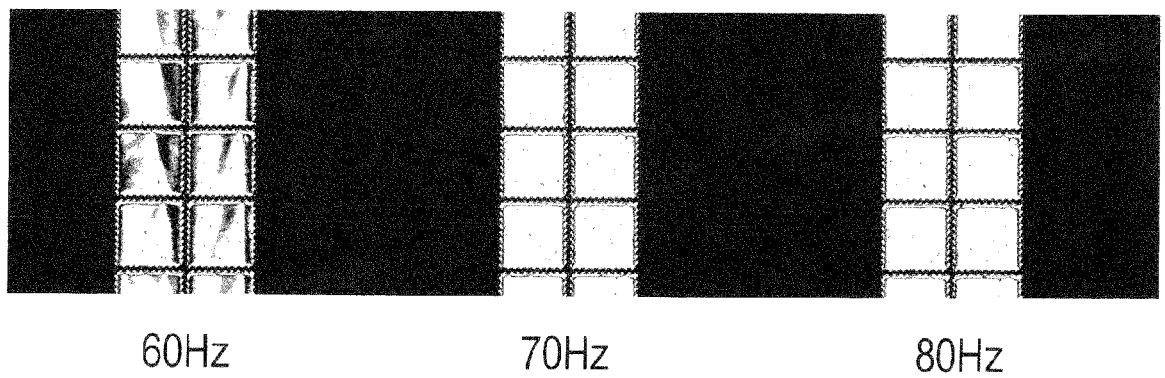
FIG. 12 represents microscopic photographs illustrating display states in a juxtaposed manner at each driving frequency of multiplex drive of the liquid crystal display apparatus of the third embodiment.

FIG. 12 represents microscopic photographs illustrating display states in a juxtaposed manner at driving frequencies of 60 Hz, 70 Hz and 80 Hz from the left side. Although the shaded area was observed at the driving frequency of 60 Hz, it disappeared at the driving frequency not lower than 70 Hz. Also in the third embodiment using a dot matrix as a display pattern, by adopting the zigzag electrode border portion, it was possible to lower the driving frequency at which the shaded area caused by DMA is not observed.

In the third embodiment, each dot (pixel) may be subjected to a multi domain alignment process to divide the pixel into a plurality of areas having different alignment direction. Each divided area is a mono domain.

Figure 14:
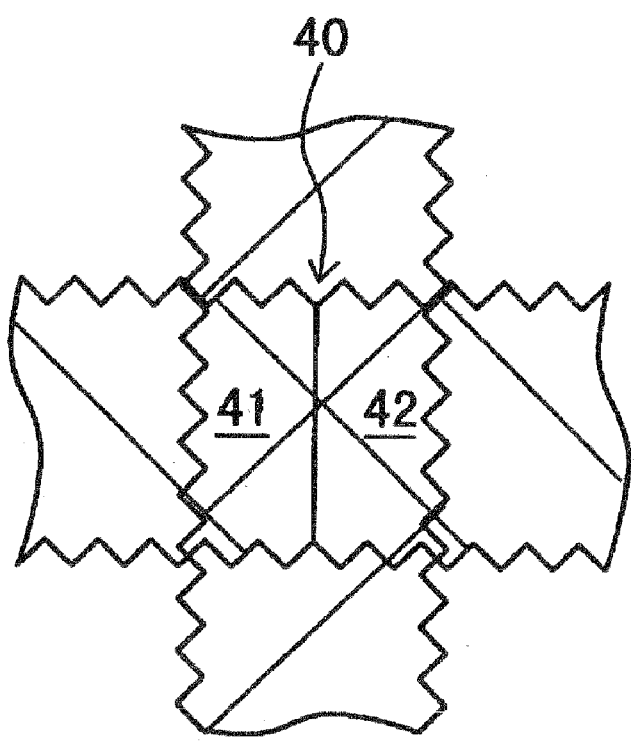
FIG. 14 is a schematic plan view illustrating a multi-domain pixel.
Figure 14:
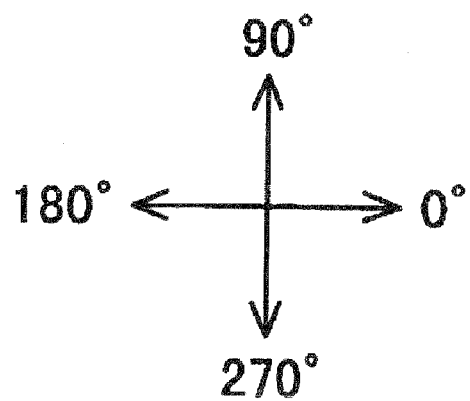

As illustrated in FIG. 14, for example, a dot (pixel) 40 is divided into a first area 41 and a second area 42 on the left and right sides, respectively. In the first area 41, the director azimuth angle direction is the 45°-225° direction, whereas in the second area 42, the director azimuth angle direction is the 135°-315° direction. Even if the director azimuth angle direction is set to the 135°-315° direction, the zigzag electrode border portion of the third embodiment is constituted of vertical and parallel portions relative to the director azimuth angle direction so that the shaded area suppression effects can be obtained.

As described above, DMA and the shaded area caused by DMA are more likely to occur the lower the driving frequency is, and less likely to occur the higher the driving frequency is. Of the multiplex driving waveforms, the A waveform with polarity inversion during one line selection and the C waveform with polarity inversion at every N-lines have higher frequency components than the B waveform with polarity inversion at every frame. Therefore, assuming the same driving frequency, DMA and the shaded area caused by DMA are more likely to occur with the B waveform than with the A or C waveform.

It is possible to suppress the shaded area caused by DMA by driving the apparatus with the A waveform, C waveform or the like having higher frequency components than those of the B waveform (refer to JP-2007-125596). However, driving with the A or C waveform having higher frequency components requires a larger consumption power than that with the B waveform. The B waveform is preferable from the viewpoint of a consumption power.

As in the above-described embodiments, driving even with the B waveform can suppress DMA and the shaded area caused by DMA, by using the zigzag electrode border portion. The techniques of the embodiments with the zigzag electrode border portion are effective particularly when the techniques are adopted for driving with the B waveform. Even if the zigzag electrode border portion is adopted for driving with the A waveform or C waveform, the suppression effects are expected for DMA and the shaded area caused by DMA.

As described earlier, the higher an operation temperature, the shaded area caused by DMA becomes more likely to be formed. The techniques of the embodiments adopting the zigzag electrode border portion suppress the shaded area from being formed. As compared to conventional techniques not adopting the zigzag electrode border portion, it is expected that the embodiment techniques raise the operation temperature at which the shaded area is formed, assuming driving at the same driving frequency. Namely, under the same driving conditions, it becomes possible to perform driving capable of suppressing occurrence of the shaded area caused by DMA up to a higher temperature than a conventional temperature.

In the above-described embodiments, although the angle between the absorption axes (or transmission axes) of the upper and lower polarizer plates is set to 90° in the display plane, it is sufficient even if the angle between the absorption axes (or transmission axes) of the upper and lower polarizer plates shifts about 50 from 90°. That an angle between the absorption axes (or transmission axes) of the upper and lower polarizer plates is in a range of 85° to 95° is called cross-Nicol disposed.

The Angles between the azimuth angle direction determined as a fall angle of liquid crystal molecules (azimuth angle direction of display in-plane component of the director) and the transmission axes (or absorption axes) of the upper and lower polarizer plates cross-Nicol disposed may be shifted by about 5° from 45°. If the angle is in a range of 40° to 50°, a sufficiently large transmissivity can be obtained.

The embodiment techniques are applicable to general vertical alignment type liquid crystal display apparatus to be multiplex driven. For example, the embodiment techniques are applicable to a segment display liquid crystal display apparatus, a dot matrix display liquid crystal display apparatus and a liquid crystal display apparatus utilizing both the segment display and dot matrix display. The embodiment techniques are applicable to liquid crystal display apparatus of any of a transmission type, a reflection type and a transmission/reflection type.

The embodiments provide a liquid crystal display apparatus including: a vertical alignment type liquid crystal cell including a first substrate formed with a first electrode, a second substrate formed with a second electrode and facing the first substrate, and a liquid crystal layer sandwiched between the first and second substrate and containing liquid crystal molecules given a pretilt angle; a pair of polarizer plates sandwiching the vertical alignment type liquid crystal cell; and a driver device for applying a voltage of a multiplex driving waveform across the first and second electrodes, wherein in a display in-plane parallel to a surface of the first or second substrate, at least one of the first and second electrodes has a zigzag border alternately coupling a first border perpendicular to display in-plane component of directors of liquid crystal molecules in a middle area along a thickness direction of the liquid crystal layer in the absence of applied voltage and a second border extending along a direction crossing the first border.

An oblique electric field generated at the first border can control the alignment state of liquid crystal molecule so as to make the liquid crystal molecules fall along a direction parallel to the display in-plane component of the director, and can suppress DMA more than the first border is not provided. The DMA suppression effects are valid also in an area spaced from the first border.

The liquid crystal display apparatus having a zigzag pattern as at least a portion of an edge of a display electrode has been studied to suppress DMA.

The embodiment techniques suppress DMA. However, there is a possibility that the zigzag shape is visually recognized and that an oblique electric field generated at the edge portion of the zigzag shape increases optical through at the edge portion during dark display.

JP-A-2000-250024 discloses a method of preventing optical through by disposing a black mask in the whole area of the background defining a display pattern.

Although the optical through can be prevented by providing a black mask in the whole area of the background, the viewer feels discomfort (phenomenon analogous to so-called cross talk) because there is a transmissivity difference between a segment not displaying and a surrounding black mask (the transmissivity of the black mask is almost 0%, approximately black color, darker than the non-displaying segment).

In the following, a liquid crystal display apparatus is studied which can suppress visual recognition of a zigzag shape and optical through caused by the edge of the zigzag shape.

Figure 15:
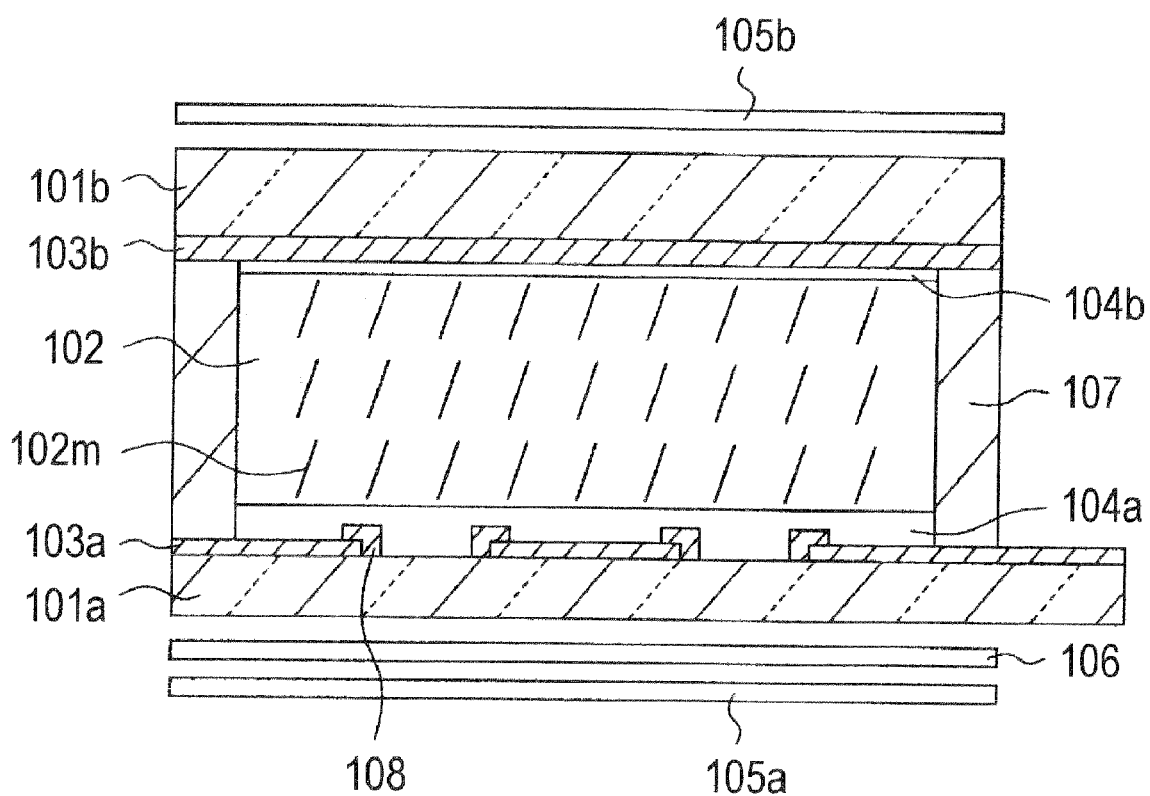
FIG. 15 is a schematic cross sectional view of a liquid crystal display apparatus according to another embodiment.

FIG. 15 is a schematic cross sectional view illustrating a liquid crystal display apparatus according to the fourth embodiment. The liquid crystal display apparatus illustrated in FIG. 15 has a back (lower) substrate 101*a* made of glass and a front (upper) substrate 101*a* made of glass and facing the back substrate. A liquid crystal layer 102 is disposed between both the substrates 101*a* and 101*b*.

Back transparent electrodes 103*a* as segment electrodes are formed on the surface of the back substrate 101*a* on the side of the liquid crystal layer 102, and a front transparent electrode 103*b* as a common electrode is formed on the surface of the front substrate 101*b* on the side of the liquid crystal layer 102.

The transparent electrodes 103*a* and 103*b* are superposed sandwiching the liquid crystal layer 102, and the superposed area constitutes a display area (display pattern).

Vertical alignment films 104*a* and 104*b* are formed over the substrates 101*a* and 101*b* on the side of the liquid crystal layer 102, covering the transparent electrodes. An insulating film may be inserted between the vertical alignment film and transparent electrodes, if necessary.

A pair of polarizer plates 105*a* and 105*b* are disposed outside the upper and lower substrates 101*a* and 101*b* along the substrate normal direction. The axes of the polarizer plates 105*a* and 105*b* are disposed at an angle of 90°. If necessary, an optical compensation plate 106 may be disposed between the substrate and polarizer plate (e.g., between the lower substrate 101*a* and lower polarizer plate 105*a*).

Rubbing is performed for the vertical alignment films 104*a* and 104*b* to set an angle of 45° between a fall direction of liquid crystal molecules (liquid crystal directors) and an axial direction of the polarizing plate.

A seal member 107 is provided as a wall for sealing the liquid crystal layer 102 and bonding the substrates 101*a* and 101*b*.

A black mask 108 is formed on the edge portion of an electrode in the display area. In this case, each black mask is formed on the side of the lower substrate.

Figure 16A:
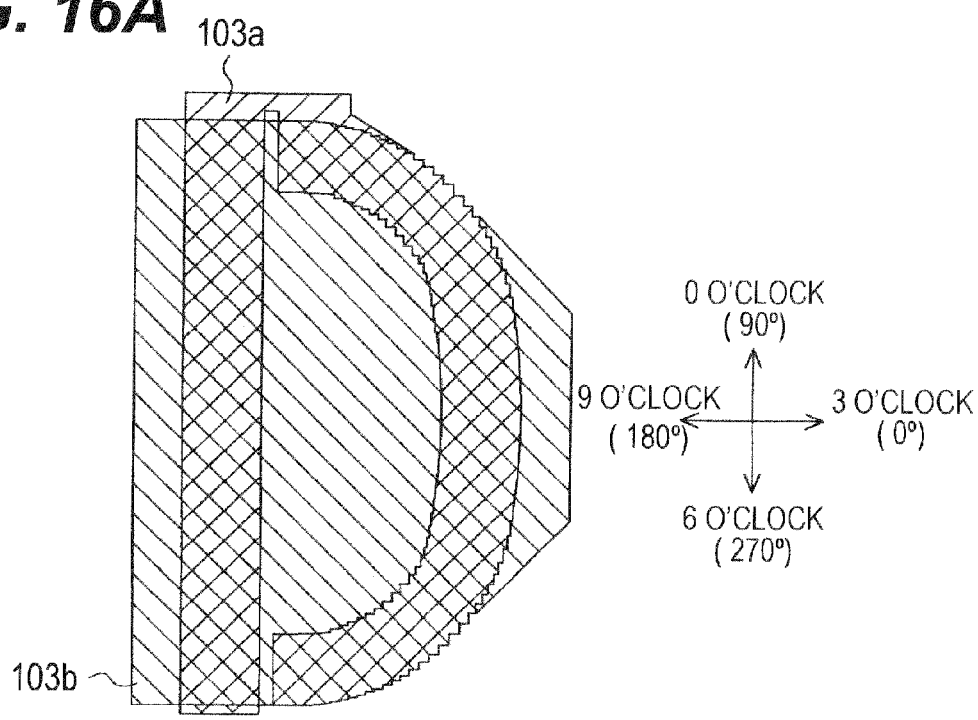
FIG. 16A is a plan view illustrating examples of a display pattern and electrodes.
Figure 16B:
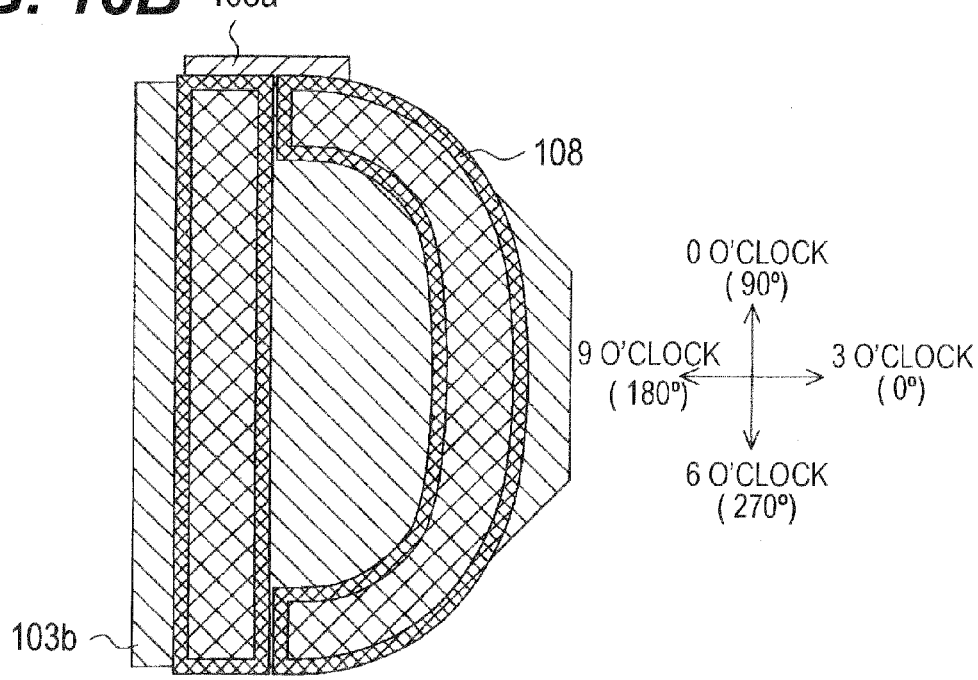
FIG. 16B is a plan view illustrating an example of the layout of black mask covering the electrode.

FIG. 16A illustrates an example of a display pattern and electrodes, and FIG. 16B illustrates an example of black masks partially covering the electrode. In FIG. 16A, right up hatching indicates the lower electrode 103*a*, and right down hatching indicates the upper electrode 103*b*. Cross hatching indicates a display pattern superposing both the substrates.

In the display pattern, sides not parallel to the up/down and right/left directions have a zigzag shape for suppressing DMA. The zigzag shape has a pattern constituted of sides along a 0 o'clock-6 o'clock (90°-270°) direction and sides along a 3 o'clock-9 o'clock (0°-180°) direction, where a 0 o'clock (90°) direction is the up direction in the drawing. A width (forming the zigzag shape) of the zigzag shape is about 40 μm.

Fine cross hatching in FIG. 16B indicates a black mask 108. The black mask 108 has a width of about 50 μm to cover the zigzag shape portion. If the black mask is too large, it can be visually recognized. Therefore, an upper limit of the width is set to 200 μm. A black mask width in an area other than the zigzag shape may be made narrower (e.g., about 20 μm). A lower limit of the width is 10 μm.

Description will be made on a manufacture method for the liquid crystal display apparatus of a vertical alignment type.

Referring to FIG. 15, first, the transparent electrodes 103*a* and 103*b* made of mainly indium tin oxide (ITO) are formed on the substrate 101*a* and 101*b*. Thereafter, zigzag patterns are formed at the edge portions of the segment electrodes 103*a* by patterning. This patterning is performed by coating photoresist on ITO, exposing the photoresist, and thereafter, by using the photoresist as a mask, etching ITO and then removing the photoresist.

The zigzag shape may be formed on the common electrode in the area corresponding to the display pattern.

Next, as described previously, the black mask 108 is formed on the edge portion of the display pattern. In this example, the black mask is formed on the segment electrode 103*a*. The black mask may be made of resin or metal. If the black mask is to be made of resin, resist with dispersed pigment, resist with dispersed carbon or the like is used. If the black mask is to be made of metal, chrome, molybdenum or the like is used. When conductive material is used, an insulating layer is required to be inserted between the black mask 108 and transparent electrodes 103*a*.

A thickness of the black mask is not limited specifically. If the black mask has a thickness of, e.g., 3 μm or thicker, too thick relative to the liquid crystal layer, it is necessary to change the edge shape to a taper shape or form a planarizing layer in order to prevent alignment disturbance of liquid crystal.

The positional relation between the black mask 108 and segment electrode 103*a* may be turned upside down, i.e., the segment electrode 103*a* may be formed on the black mask 108.

The vertical alignment films 104*a* and 104*b* are coated and baked, covering the transparent electrodes 103*a* and 103*b* and black mask 108. The vertical alignment film material may be SE1211 manufactured by Nissan Chemical Industries Ltd.

Rubbing is performed for the vertical alignment films to give a pretilt angle of, e.g., 89.5° where a substrate normal direction is 90°. Antiparallel rubbing is performed for the upper and lower substrates along any of the directions 0 o'clock, 3 o'clock, 6 o'clock and 9 o'clock illustrated in FIGS. 16A and 16B. Control (alignment process) for a fall direction of liquid crystal molecules may be slit alignment, projection alignment, ultraviolet ray alignment or the like.

Next, main seal material is coated on the substrates 101*a* and 101*b*, and gap control members having a predetermined diameter (in this example, 4 μm) are dispersed, thereafter both the substrates 101*a* and 101*b* are stacked with the electrode side being directed inside, and the main seal members are cured to form an empty cell.

Liquid crystal is injected into the empty cell to form the liquid crystal layer 102. Liquid crystal material having negative dielectric constant anisotropy Δε and a birefringence Δn of about 0.09 is used. Liquid crystal molecules 102*m* in the liquid crystal layer 102 are aligned generally vertically by the function of the vertical alignment films. If the liquid crystal material has negative dielectric constant anisotropy, other physical values and a cell thickness are not limited specifically.

Thereafter, the optical compensation plate 106 and back polarizer plate 105*a* are bonded to the outside (lower side in FIG. 15) of the back substrate 101*a*, and the front polarizer plate 105*b* is bonded to the outside (upper side in FIG. 15) of the front substrate 101*b*. For example, SHC-125U manufactured by Polatechno Co., Ltd is used as the polarizer plate. The axial direction of the polarizer plate is the one thirty o'clock-seven thirty o'clock (45°-225°) direction, and the axial direction of the other polarizer plate is the four thirty o'clock-ten thirty o'clock (135°-315°) direction. The polarizer plates are cross-Nicol disposed.

For example, a biaxial plate (in-plane retardation $\Delta R$=50 nm and a thickness direction retardation $\Delta$th=220 nm) is used as the optical compensation plate 106. The biaxial plate is disposed in such a manner that the in-plane delay phase axis of the biaxial plate is perpendicular to the absorption axis of the back polarizer plate 105*a*. Instead of the biaxial plate, an A plate, a biaxial phase difference plate or the like may be used as the optical compensation plate 106.

The liquid crystal display apparatus manufactured in the above-described manner was multiplex driven and the display state was observed. DMA did not appear and a phenomenon like cross talk was not visually recognized in low frequency driving at 80 Hz. Since the black mask had a narrow width of 50 μm, the black mask could not be visually recognized. For the comparison, a liquid crystal display apparatus was manufactured having the same display pattern, no zigzag shape and no black mask (the other structures are the same). This liquid crystal display apparatus was driven. DMA occurred and a display quality was bad.

By forming an electrode pattern edge in a zigzag shape, the fall direction of liquid crystal molecules determined by the alignment process is parallel or perpendicular to the direction of the oblique electric field generated at the electrode edge. This is considered as the reason of suppressed DMA.

However, the zigzag edge may cause optical leak during dark display so that there is a fear that a large contrast ratio cannot be obtained.

In the embodiment, optical leak is cut by providing a black mask covering the display edge portion including the zigzag pattern. Since a width of the black mask is narrow, a density difference of white and black between a background and an off segment is observed hardly so that the liquid crystal display apparatus with an improved display quality can be obtained.

DMA is likely to occur in low frequency driving. According to the embodiment, both DMA occurrence and optical leak can be prevented even at a low frequency and a display quality is improved. As a countermeasure for DMA, the A or C waveform may be used having a high pulse frequency and intra-frame inversion. Since low frequency driving can be performed, the B waveform with frame inversion generally used can be adopted so that a drive circuit can be simplified and manufacture cost is lowered. Since low frequency driving is possible, a consumption power can be suppressed.

The present invention has been described in connection with the embodiments. The present invention is not limited to the embodiments. For example, it is obvious for those skilled in the art to make various modifications, improvements and combinations.

What are claimed are:

1. A liquid crystal display apparatus comprising:
    a vertical alignment type liquid crystal cell including a first substrate formed with a first electrode, a second substrate formed with a second electrode and facing said first substrate, and a liquid crystal layer sandwiched between said first and second substrate and containing liquid crystal molecules given a pretilt angle;
    a pair of polarizer plates sandwiching said vertical alignment type liquid crystal cell; and
    a driver device for applying a voltage of a multiplex driving waveform across said first and second electrodes,
    wherein in a display in-plane parallel to a surface of said first or second substrate, at least one of said first and second electrodes has a zigzag border comprising, alternately, a first border perpendicular to display in-plane components of directors of liquid crystal molecules in a middle area along a thickness direction of said liquid crystal layer in the absence of applied voltage and a second border extending along a direction crossing said first border; and
    wherein said zigzag border is disposed on a border portion of a display pattern to be recognized by an observer.

2. The liquid crystal display apparatus according to claim 1, wherein said border portion is neither perpendicular nor parallel to display in-plane components of directors of liquid crystal molecules in a middle area along a thickness direction of said liquid crystal layer in the absence of applied voltage.

3. The liquid crystal display apparatus according to claim 1, wherein a length of each of said first and second borders is shorter than 100 μm.

4. The liquid crystal display apparatus according to claim 1, wherein said pair of polarizer plates are cross-Nicol disposed in such a manner that an angle between transmission axes of said polarizer plates is in a range of 85°-95° in the display in-plane, and an angle between each of the transmission axes of said polarizer plates and the display in-plane components of directors of liquid crystal molecules in a middle area along a thickness direction of said liquid crystal layer in the absence of applied voltage is in a range of 40°-50°.

5. The liquid crystal display apparatus according to claim 4, wherein said second border is parallel to said display in-plane components of directors of liquid crystal molecules in a middle area along a thickness direction of said liquid crystal layer in the absence of applied voltage.

6. The liquid crystal display apparatus according to claim 1, wherein chiral agent is added to said liquid crystal layer.

7. The liquid crystal display apparatus according to claim 1, wherein said driving waveform is a B waveform with polarity inversion at each frame for performing frame inversion driving.

8. The liquid crystal display apparatus according to claim 1, further comprising a mask member disposed covering an edge of the display pattern defined by said first and second electrodes.

* * * * *